US011144527B2

(12) United States Patent
Sarin et al.

(10) Patent No.: US 11,144,527 B2
(45) Date of Patent: Oct. 12, 2021

(54) OPTIMIZING DATABASE TABLE SCANS IN THE PRESENCE OF ORDERED DATA

(71) Applicant: International Business Machines Corporation, Armonk, NY (US)

(72) Inventors: Sunil Sarin, Newton, MA (US); Ronen Grosman, Toronto (CA); Adam J. Storm, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 16/742,275

(22) Filed: Jan. 14, 2020

(65) Prior Publication Data
US 2021/0216519 A1 Jul. 15, 2021

(51) Int. Cl.
*G06F 16/22* (2019.01)
*G06F 16/2453* (2019.01)
*G06F 16/28* (2019.01)

(52) U.S. Cl.
CPC .... *G06F 16/2282* (2019.01); *G06F 16/24534* (2019.01); *G06F 16/289* (2019.01)

(58) Field of Classification Search
CPC .................................................. G06F 16/2282
See application file for complete search history.

(56) References Cited

U.S. PATENT DOCUMENTS 6,973,452 B2    12/2005  Metzger et al.
7,937,541 B2 *   5/2011  Bhattacharjee ... G06F 16/24534
                                                        711/154
2005/0010564 A1 *  1/2005  Metzger .............. G06F 16/2282
2008/0215556 A1 *  9/2008  Surna ..................... G06F 16/245
2009/0063527 A1 *  3/2009  Corvinelli ......... G06F 16/24544
2010/0023477 A1 *  1/2010  Thiebaut-George ........................
                                                G06F 16/24561
                                                707/E17.131
2011/0208754 A1 *  8/2011  Li ........................... G06F 16/20
                                                        707/750
2015/0242452 A1 *  8/2015  Dickie .................. G06F 16/248
                                                        707/700
2015/0286682 A1 * 10/2015  Ziauddin ............ G06F 16/2282
                                                        707/718
2016/0188623 A1 *  6/2016  Finlay ................ G06F 16/2255
                                                        707/690

(Continued)

OTHER PUBLICATIONS

Bayliss, "Optimizing Table Scans with Zone Maps," Oracle, The Data Warehouse Insider, Functionality, Nov. 11, 2014, 7 pages. https://blogs.oracle.com/datawarehousing/optimizing-table-scans-with-zone-maps.

*Primary Examiner* — Charles E Lu
(74) *Attorney, Agent, or Firm* — Yee & Associates, P.C.

(57) ABSTRACT

Optimizing database table scans in presence of SMDO records is provided. An SMDO record corresponding to a most recent span of rows for a column associated with a query predicate is read. It is determined whether a condition for excluding a span of rows is true for the SMDO record based on a type of the query predicate. In response to determining that a condition for excluding a span of rows is not true for the SMDO record, the most recent span of rows is added to a list of spans of rows to scan. It is determined whether a condition for excluding all preceding spans of rows is true for the SMDO record based on the type of the query predicate. In response to determining that a condition for excluding all preceding spans of rows is true for the SMDO record, reading the set of SMDO records is stopped.

20 Claims, 30 Drawing Sheets

(56) References Cited

U.S. PATENT DOCUMENTS

2017/0169070 A1* 6/2017 Finnie ................ G06F 16/2365
2018/0113889 A1* 4/2018 Brodt ................... G06F 16/215
2019/0220464 A1* 7/2019 Butani ................. G06F 16/248

* cited by examiner

SMDO RECORD INFORMATION 300

| SMDO FIELD | SEMANTICS | TARGET QUERY PREDICATE TYPES |
|---|---|---|
| Max_value | HIGHEST non-NULL VALUE FOR THE COLUMN IN THIS SPAN OF ROWS | =, >, >=, BETWEEN, IN, equi-join |
| Min_value | LOWEST non-NULL VALUE IN THIS SPAN OF ROWS | =, <, <=, BETWEEN, IN, equi-join |
| Bloom_value | BLOOM FILTER FOR VALUES IN THIS SPAN OF ROWS | =, IN (FOR SMALL IN-lists) |
| Max_prec | CUMULATIVE MAXIMUM VALUE FOR THIS COLUMN OVER ALL PRECEDING SPANS OF ROWS | =, >, >=, BETWEEN, IN, equi-join |
| Min_prec | CUMULATIVE MINIMUM VALUE FOR THIS COLUMN OVER ALL PRECEDING SPANS OF ROWS | =, <, <=, BETWEEN, IN, equi-join |
| Bloom_prec | CUMULATIVE BLOOM FILTER OVER ALL PRECEDING SPANS OF ROWS | =, IN (FOR SMALL IN-lists) |

FIG. 3

| | 502 | 504 | 506 | 508 | 510 |
|---|---|---|---|---|---|
| | SPAN ID | SPAN MAXIMUM VALUE | CUMULATIVE MAXIMUM VALUE OVER PRECEDING SPANS | SPAN MINIMUM VALUE | CUMULATIVE MINIMUM VALUE OVER PRECEDING SPANS |
| 500 SMDO RECORDS | 10 | 2019-08-28 | 2019-08-25 | 2019-08-25 | 2019-08-20 |
| | 9 | 2019-08-25 | 2019-08-20 | 2019-08-20 | 2019-08-16 |
| | 8 | 2019-08-20 | 2019-08-15 | 2019-08-16 | 2019-08-09 |
| | 7 | 2019-08-15 | 2019-08-09 | 2019-08-09 | 2019-08-01 |
| | 6 | 2019-08-09 | 2019-07-30 | 2019-08-01 | 2019-07-26 |
| | 5 | 2019-07-30 | 2019-07-26 | 2019-07-26 | 2019-07-20 |
| | 4 | 2019-07-26 | 2019-07-19 | 2019-07-20 | 2019-07-18 |
| | 3 | 2019-07-19 | 2019-07-17 | 2019-07-18 | 2019-07-16 |
| | 2 | 2019-07-17 | 2019-07-16 | 2019-07-16 | 2019-07-14 |
| | 1 | 2019-07-16 | N.A. | 2019-07-14 | N.A. |

FIG. 5

CONDITIONS FOR EXTENDED SMDO RECORD OPTIMIZATION OF QUERY PREDICATES
800

| 802 QUERY PREDICATE | 804 REQUIRED SMDO FIELDS ON colname FOR SMDO OPTIMIZATION TO BE APPLICABLE | 806 CONDITION FOR EXCLUDING A GIVEN SPAN OF ROWS FROM NEEDING TO BE SCANNED | 808 CONDITION FOR EXCLUDING ALL PRECEDING SPANS OF ROWS FROM NEEDING TO BE SCANNED | 810 BENEFIT |
|---|---|---|---|---|
| colname > value | max_val, max_prec | max_val <= value | max_prec <= value | WHEN COLUMN VALUES ARE IN ASCENDING ORDER OR MOSTLY IN ASCENDING ORDER, ILLUSTRATIVE EMBODIMENTS MAY NOT NEED TO SCAN A SIGNIFICANT NUMBER OF SMDO RECORDS |
| colname >= value | max_val, max_prec | max_val < value | max_prec < value | WHEN COLUMN VALUES ARE IN ASCENDING ORDER OR MOSTLY IN ASCENDING ORDER, ILLUSTRATIVE EMBODIMENTS MAY NOT NEED TO SCAN A SIGNIFICANT NUMBER OF SMDO RECORDS |
| colname < value | min_val, min_prec | min_val >= value | min_prec >= value | WHEN COLUMN VALUES ARE IN DESCENDING ORDER OR MOSTLY IN DESCENDING ORDER, ILLUSTRATIVE EMBODIMENTS MAY NOT NEED TO SCAN A SIGNIFICANT NUMBER OF SMDO RECORDS |
| colname <= value | min_val, min_prec | min_val > value | min_prec > value | WHEN COLUMN VALUES ARE IN DESCENDING ORDER OR MOSTLY IN DESCENDING ORDER, ILLUSTRATIVE EMBODIMENTS MAY NOT NEED TO SCAN A SIGNIFICANT NUMBER OF SMDO RECORDS |

FROM FIG. 8A

| | | | |
|---|---|---|---|
| colname BETWEEN value1 AND value2 | min_val, max_val, AT LEAST ONE OF (min_prec, max_prec) | max_val < value1 OR min_val > value2 | max_prec < value1 OR min_prec > value2 | WHEN COLUMN VALUES ARE ENTIRELY OR MOSTLY IN ASCENDING OR DESCENDING ORDER, ILLUSTRATIVE EMBODIMENTS MAY NOT NEED TO SCAN A SIGNIFICANT NUMBER OF SMDO RECORDS. Max_prec PROVIDES BENEFIT WHEN COLUMN VALUES ARE IN ASCENDING ORDER AND min_prec PROVIDES BENEFIT WHEN COLUMN VALUES ARE IN DESCENDING ORDER |
| colname = value | min_val, max_val, AT LEAST ONE OF (min_prec, max_prec) | max_val < value OR min_val > value | max_prec < value OR min_prec > value | WHEN COLUMN VALUES ARE ENTIRELY OR MOSTLY IN ASCENDING OR DESCENDING ORDER, ILLUSTRATIVE EMBODIMENTS MAY NOT NEED TO SCAN A SIGNIFICANT NUMBER OF SMDO RECORDS. Max_prec PROVIDES BENEFIT WHEN COLUMN VALUES ARE IN ASCENDING ORDER AND min_prec PROVIDES BENEFIT WHEN COLUMN VALUES ARE IN DESCENDING ORDER |
| colname = value | bloom_val, bloom_prec. FIRST OBTAIN A STRING OF BITS *string* BY APPLYING BLOOM FILTER HASH FUNCTIONS TO *value* | AT LEAST ONE "1" BIT IN *string* IS NOT SET IN bloom_val | AT LEAST ONE "1" BIT IN *string* IS NOT SET IN bloom_prec | WHEN *value* CANNOT APPEAR IN ANY PRECEDING SPAN OF ROWS AS DETERMINED BY bloom_prec, ILLUSTRATIVE EMBODIMENTS NEED NOT SCAN THE CORRESPONDING SMDO RECORDS |
| colname IN (*list*), OR EQUI-JOIN OF colname AGAINST A *list* OF VALUES DETERMINED AT QUERY PROCESSING TIME | min-val, max_val, min-prec, max-prec | rec.max_val < SMALLEST VALUE IN *list* OR rec.min_val > LARGEST VALUE IN *list* OR NO VALUES IN *list* ARE IN THE RANGE [min_val, max_val], INCLUSIVE | rec.max_prec < SMALLEST VALUE IN *list* OR rec.min_prec > LARGEST VALUE IN *list* OR NO VALUES IN *list* ARE IN THE RANGE [min_prec, max_prec], INCLUSIVE | WHEN COLUMN VALUES ARE ENTIRELY OR MOSTLY IN ASCENDING OR DESCENDING ORDER, ILLUSTRATIVE EMBODIMENTS MAY NOT NEED TO SCAN A SIGNIFICANT NUMBER OF SMDO RECORDS |

FROM FIG. 8B

| | | | |
|---|---|---|---|
| colname IN (list), WHERE list HAS A SMALL NUMBER OF ELEMENTS | bloom_val, bloom_prec. FIRST OBTAIN A LIST OF STRINGS OF BITS strings BY APPLYING BLOOM FILTER HASH FUNCTIONS TO EACH VALUE IN list | FOR EVERY STRING OF BITS IN strings AT LEAST ONE "1" BIT IS NOT SET IN bloom_val | FOR EVERY STRING OF BITS IN strings AT LEAST ONE "1" BIT IS NOT SET IN bloom_prec | WHEN ANY OF THE VALUES IN list CANNOT APPEAR IN ANY PRECEDING SPAN OF ROWS AS DETERMINED BY bloom_prec, ILLUSTRATIVE EMBODIMENTS NEED NOT SCAN THE CORRESPONDING SMDO RECORDS |
| colname <> value (NOT EQUALS) | min_val, max_val, min_prec, max_prec | max_val = min_val = value | max_prec = min_prec = value | WHEN QUERYING FOR COLUMN VALUES OTHER THAN A VERY COMMONLY OCCURRING value, IF THE BEGINNING OF THE TABLE SLICE IS FILLED WITH ROWS ALL HAVING THAT value AND THERE ARE NO OTHER ROWS IN THOSE SPANS OF ROWS WITH A DIFFERENT VALUE FOR colname, THEN ILLUSTRATIVE EMBODIMENTS MAY NOT NEED TO SCAN A SIGNIFICANT NUMBER OF SMDO RECORDS |
| colname NOT IN (list) | min_val, max_val, min_prec, max_prec | max_val = min_val = SOME VALUE IN list | max_prec = min_prec = SOME VALUE IN list | WHEN QUERYING FOR COLUMN VALUES OTHER THAN A LIST OF COMMONLY OCCURRING VALUES, IF THE BEGINNING OF THE TABLE SLICE IS FILLED WITH ROWS ALL HAVING SOME SINGLE VALUE FROM list AND THERE ARE NO OTHER ROWS IN THOSE SPANS OF ROWS WITH A DIFFERENT VALUE FOR colname, THEN ILLUSTRATIVE EMBODIMENTS MAY NOT NEED TO SCAN A SIGNIFICANT NUMBER OF SMDO RECORDS |

FIG. 8C

OPTIMIZING DATABASE TABLE SCANS IN THE PRESENCE OF ORDERED DATA

BACKGROUND

1. Field

The disclosure relates generally to database table scans and more specifically to optimizing database table scans in the presence of ordered data.

2. Description of the Related Art

A database table scan is a scan made on a database where each row of a table under scan is read in sequential order and columns encountered are checked for validity of a condition, such as a query predicate. Full database table scans are usually the slowest method of scanning a table due to the heavy amount of input/output (I/O) reads required from a disk drive consisting of multiple seeks, as well as costly disk to memory transfers. In a database, a query that cannot take advantage of available table indices results in a full table scan, where the database processes each record of the table to find all records meeting the given condition. Even if the query selects just a few rows from the table, all rows in the entire table will be examined. This usually results in sub-optimal performance, but may be acceptable with very small tables or when the overhead of keeping indexes up to date is high.

Synopses or zone maps, also collectively referred to as Summarizing Meta-Data Objects (SMDOs), are commonly used in relational database systems to optimize queries with significantly less storage and maintenance overhead than conventional indices. SMDOs maintain summary information, such as maximum value, minimum value, and sometimes Bloom filter bits, regarding a block or group of database rows. Whereas indexes help identify where data relevant to a query is, SMDOs provide a lower-cost way of identifying where relevant data is not. Database systems thus leverage SMDOs to avoid scanning blocks of rows that cannot satisfy query predicates. For example, a query of the form "select * from t1 where date>today-5 days" in the presence of an SMDO on "date" would first scan the SMDO records to identify all blocks of rows in which one or more rows have a "date" greater than 5 days old. Then, the underlying table would be scanned for the rows that do match the query predicate, but only blocks of rows that may satisfy the query predicate, based on the scan of the SMDO records, would be consulted. If a multitude of blocks of rows exist in the table that do not include a timestamp value greater than 5 days old, then these blocks do not need to be scanned and the savings using SMDOs may be significant.

SUMMARY

According to one illustrative embodiment, a computer-implemented method for optimizing database table scans in a presence of a set of Summarizing Meta-Data Object (SMDO) records that store a maximum value, a minimum value, and a Bloom filter associated with each respective span of rows in a table for a column and that store computed values for cumulative maximum, cumulative minimum, and cumulative Bloom filter for the column over all previously generated spans of rows in the table is provided. A computer reads an SMDO record in the set of SMDO records corresponding to a most recent span of rows for a column in a table associated with a query predicate. The SMDO record includes SMDO fields required by a type of the query predicate. The computer determines whether a condition for excluding a span of rows is true for the SMDO record corresponding to the most recent span of rows for the column based on the type of the query predicate. In response to the computer determining that a condition for excluding a span of rows is not true for the SMDO record corresponding to the most recent span of rows for the column based on the type of the query predicate, the computer adds the most recent span of rows to a list of spans of rows to scan for results of the query predicate. The computer determines whether a condition for excluding all preceding spans of rows is true for the SMDO record corresponding to the most recent span of rows for the column based on the type of the query predicate. In response to the computer determining that a condition for excluding all preceding spans of rows is true for the SMDO record corresponding to the most recent span of rows for the column based on the type of the query predicate, the computer stops reading the set of SMDO records. In response to the computer determining that a condition for excluding all preceding spans of rows is not true for the SMDO record corresponding to the most recent span of rows for the column based on the type of the query predicate, the computer reads another SMDO record in the set of SMDO records corresponding to a next most recent span of rows for the column in the table associated with the query predicate and repeating steps. According to other illustrative embodiments, a computer system and computer program product for optimizing database table scans in a presence of a set of Summarizing Meta-Data Object (SMDO) records that store a maximum value, a minimum value, and a Bloom filter associated with each respective span of rows in a table for a column and that store computed values for cumulative maximum, cumulative minimum, and cumulative Bloom filter for the column over all previously generated spans of rows in the table are provided.

BRIEF DESCRIPTION OF THE DRAWINGS

FIG. 3 is a diagram illustrating an example of SMDO record information in accordance with an illustrative embodiment;

FIG. 5 is a diagram illustrating an example of SMDO records in accordance with an illustrative embodiment;

FIGS. 8A-8C are a diagram illustrating conditions for extended SMDO record scan optimization of simple query predicates in accordance with an illustrative embodiment;

DETAILED DESCRIPTION

Figure 1:
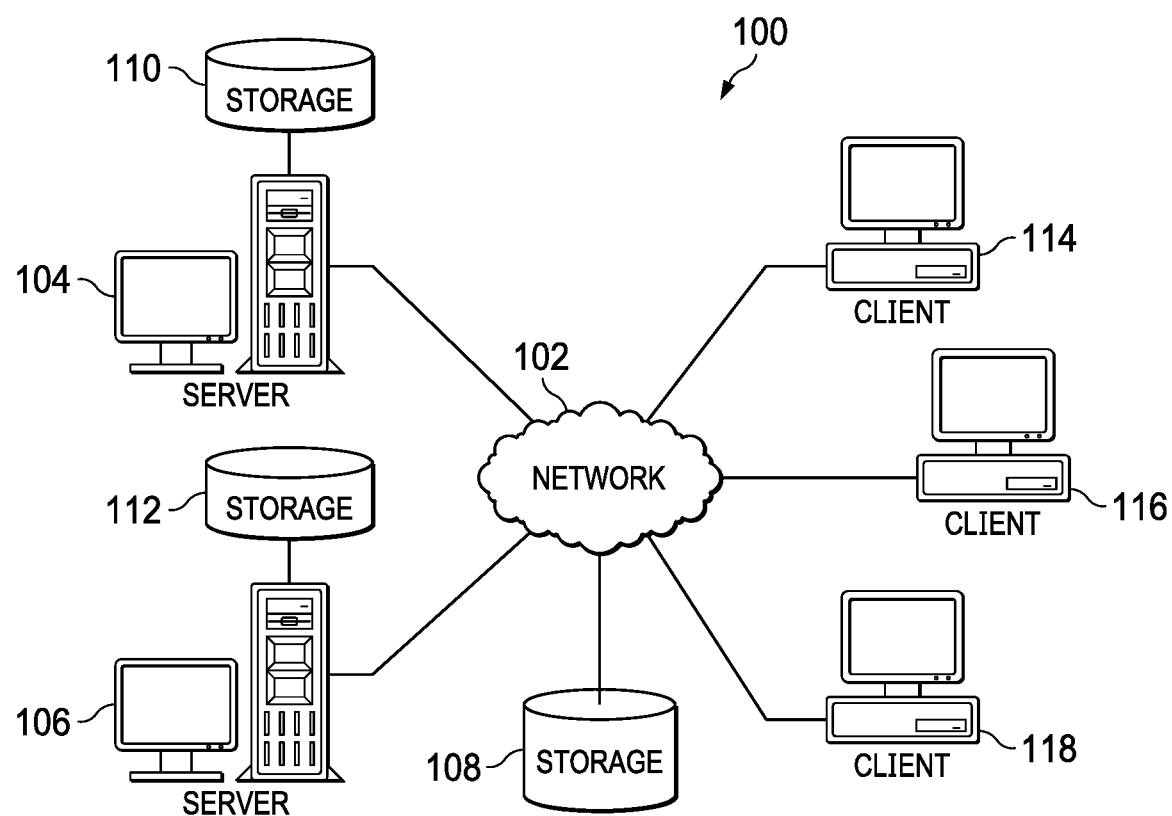
FIG. 1 is a pictorial representation of a network of data processing systems in which illustrative embodiments may be implemented.

Currently, SMDOs do not take advantage of data that is ordered (e.g., by time). Using SMDO records to speed up a database query generally requires scanning all SMDO records for individual spans of rows in a table, which in a large data warehouse may run into tens of thousands, hundreds of thousands, or more of SMDO records being scanned. For example, in a case where data is loaded in time order, an SMDO record exists on the time column, and a query arrives of the form "select * from t1 where timestamp>today-5 days", it would be beneficial if the SMDO record scan could recognize that the data is time ordered and once a timestamp is reached that is more than 5 days old, the SMDO scan could terminate without examining further SMDO records since the associated older data is known to contain no timestamps less than 5 days old. Even when data is not totally time ordered, but is mostly time ordered (e.g., some timeseries data occasionally arrives "late"), a significant reduction in SMDO record scan time may be achieved.

A given table consists of one or more disjoint horizontal sets of rows called table slices. In a database distributed across multiple database servers, each database server that stores at least one row of a given table will have at least one slice of that particular table and possibly more in some architectures. For some or all columns in a table slice, illustrative embodiments associate an SMDO record with each span of rows, where a span of rows is an implementation-defined subset of a table slice. In a row-organized table, a span of rows may consist of rows stored in a unit of physical storage (e.g., a page, extent, or block), whereas in a column-organized table a span of rows may be a logical range of rows identified by starting and ending row numbers.

An SMDO for a given table slice and column is a collection of SMDO records for that table and column covering all spans of rows in that given table slice. Also, it should be noted that a "record" as used herein refers to an SMDO and a "row" refers to a table and table slice.

An SMDO scan, for a query predicate against a given table column, reads and processes the SMDO records associated with that column, in order to determine which spans of rows need to be read in order to find rows matching the query predicate. A table scan, for a query, which may include multiple simple query predicates, scans all rows in the table or all rows within a list of spans that are identified by one or more SMDO scans or a subset of table rows identified by some auxiliary structure (e.g., an index).

Maintenance of SMDO records are performed as a database table is modified. For example, SMDO record fields maximum value, minimum value, and Bloom filter are updated for a given table column and span when rows are inserted into the span. If an incoming column value is larger than the maximum value currently stored in the SMDO record, then the maximum value is updated to reflect the new value. Similarly, the minimum value is updated when an incoming value is smaller than the minimum value currently stored in the SMDO record and update the Bloom filter field by ORing in the bits obtained by applying the Bloom filter hash functions to the newly inserted value.

In many current systems, data is inserted only at the end of a given table slice. A single database server may have multiple slices (also known as "partitions) for a given table, which allows for inserting from concurrent transactions into the table. In such systems, only the current or last span in a slice will ever have its SMDO record updated. In such systems, SMDO fields for preceding spans that no longer allow additional insertions are immutable, except in systems where "grooming", "re-clustering", or "generate statistics" operations can regenerate fresh SMDO records with current maximum, minimum, and the like values for spans that may have been affected by deletions of data. If rows can be deleted from a table span, the SMDO records associated with that span are generally not updated because of the overhead of determining fresh maximum, minimum, and the like values, which will require re-scanning remaining non-deleted column values. Therefore, the maximum value in an SMDO record is generally an upper bound (i.e., the actual maximum value cannot be greater than what the SMDO record shows) and the minimum value is a lower bound. Similarly, Bloom filter in an SMDO record is an upper bound in the sense that more bits may be set than would have been from ORing the hash bits for just the values that have not been deleted. Updates of values of a column of a table are generally treated, for the sake of SMDO record maintenance, as a combination of deleting existing rows and inserting rows. That is, maximum, minimum, and the like values in SMDO records do not take into account the existing column value(s) that are being replaced (i.e., "deleted") by the update, and the new column value(s) that replace the existing values are treated the same as when a new row is being inserted (i.e., the maximum, minimum, and the like values may need to be updated to reflect the new column value(s)). In "multi-version" database storage systems, the new values are generally inserted only at the end of a table slice and the existing values, which may be in some earlier span, are "marked" as deleted. However, in systems that support "update in place", the new values may be inserted in the same span as the existing values being replaced. This determines which SMDO records may need to be updated based on the new column values.

To show how SMDOs are used in query processing, simple query predicates, such as colname=value, colname>value, and the like, are used herein. A complex database query, with AND, OR, and NOT operators, joins, and the like, is generally decomposed into a graph of query fragments, where the form of the graph and the choice of query fragments is determined by a query optimizer and some of the query fragments are simple query predicates, which are not decomposed further, of the form described. In the absence of auxiliary access structures, such as indexes or SMDOs, evaluating a query predicate against a table requires a full scan of all rows of the table to find the rows that match the given predicate. An index is a common structure in many relational database management systems that offers fast direct access to just those rows that match the query predicate, which for most queries (except when the set of matching rows is a significantly large fraction of all the rows in the table) is typically much faster than a full scan of all rows. Some kinds of index structures, such as hash indexes, are unordered and provide fast access only when the query predicate involves an '=' operator (or an 'IN' predicate or an equi-join). However, other kinds of index structures, such as B+ trees, are ordered and can also provide fast access to rows when the query predicate operator is '>', '>=', '<', '<=', or 'BETWEEN' (as well as '=' and 'IN'). Because of the level of precision provided by indexes, the storage space consumed by a table index can be quite significant compared to the storage space consumed by the table itself. When multiple indexes are created to support different kinds of queries against a table, the space consumed by the indexes often exceeds the space consumed by the table rows. Indexes also need to be updated when the underlying table is modified, so that the index structure always designates the correct set of rows matching each value in the index.

SMDOs, on the other hand, are a coarse (i.e., less precise) form of auxiliary structure that consume significantly less space and incur significantly less maintenance. The typical method by which an SMDO is used to process a simple query predicate against a table is as follows. "Rec.span" below identifies the span of rows (e.g., a logical block or a physical block) that the SMDO record "rec" refers to (i.e., stores maximum, minimum, and the like values for).

For each SMDO record "rec" for the given colname:
    If the condition for excluding a given span of rows is true for "rec", skip over rec.span;
      else add rec.span to list of spans to be scanned.
Return list of spans of rows for evaluation of the query predicate.

Take as an example, "colname>value" as the query predicate for illustration. Methods for other predicate operators are very similar. The condition for excluding a span of rows identified by "rec.span" is "rec.max_val<=value". The only spans of rows that need to be scanned for this kind of query predicate are those where the highest value, i.e., rec.max_val, for colname is greater than value.

In addition, database systems may apply Bloom filters when a query predicate is "colname=value". The Bloom filter in the SMDO record for a given column and span of rows will be a bit string that is generated by applying multiple hash functions against each column value in the span and setting a "1" bit at the position that is a result of each hash function. For a query predicate "colname=value", the same hash functions are applied to value to obtain a bit string string. The condition for excluding a span of rows identified by "rec.span" is: If at least one "1" bit in string is not set to "1" in the Bloom filter for a given span of rows, then it is known that value does not appear in that span of rows. The only spans of rows that need to be scanned for this kind of query predicate are those where all of the bits in string that are set to "1" are also set to "1" in the Bloom filter for the given span of rows.

Database systems may utilize SMDO records in equi-join and IN-list queries as well. Consider a query of the form "AN INNER JOIN B ON A.colname1=B.colname2". Assume that the query graph calls for the relevant set of values, which may be a subset of all of the colname2 values in B as a result of other predicates in the overall query, for B.colname2 to be collected into a sorted list. The technique that follows also applies to query fragments where a list of values is provided in a "colname IN ( . . . )" predicate. The condition for excluding a span of rows identified by "rec.span" is: rec.max_val<smallest value in "list", or rec.min_val>largest value in "list", or no values in "list" are in the range [rec.min_val, rec.max_val]. Determining whether or not "no values in 'list' are in the range [rec.min_val, rec.max_val]" can be done quite efficiently with a binary search, if 'list' is sorted. For example, find the first value in list that is >=rec.min_val. If there is such a value and it is <=rec.max_val, then at least one value lies within the range of values for the span of rows. Otherwise, none of the values do.

For more complex queries, database systems use known techniques for combining the results (lists of spans of rows that need scanning) of applying to above SMDO-based optimizations to different query fragments. For example, with an AND operator, the intersection of two or more lists of spans of rows identified by the above determines the list of spans of rows for which values will be examined. With an OR operator, the union of the two or more lists of spans identified by the above determines the list of spans for which values will be examined. These combining techniques do not bear directly on illustrative embodiments, but are mentioned to demonstrate that when illustrative embodiments are used for optimizing simple query predicates, which can identify the relevant spans of rows more quickly than is possible with existing SMDOs, illustrative embodiments can apply these existing combining techniques for combining results in more complex queries.

The logic above is used as a basis for highlighting illustrative embodiments, primarily in the area of not requiring every single SMDO record (for the column in question) to be scanned in order to identify the correct (and identical) list of spans of rows that need to be examined for matching values.

Illustrative embodiments extend SMDO records so that each SMDO record also stores the cumulative value of a given summary field across all preceding spans of rows. It should be noted that alternative illustrative embodiments may record only a subset of the summary fields, based on application query patterns. For example, in some cases it may not be beneficial for illustrative embodiments to maintain Bloom_preceding, as well as maximum value_preceding and minimum value_preceding, or vice versa, for the same table column. Or, when values for a given table column are generally ascending, illustrative embodiment may maintain maximum value_preceding, but not minimum value_preceding for that column. Similarly, illustrative embodiments may find minimum value_preceding more beneficial than maximum value_preceding when column values are generally descending. The subset of SMDO fields available for a given table column is a database design time choice made by, for example, a user, a database administrator, and/or an automated assistant.

When a new span of rows is started in a table slice, illustrative embodiments compute the values of the cumulative maximum value preceding, cumulative minimum value preceding, and cumulative Bloom filter preceding SMDO fields for the new span by examining the SMDO record for only the immediately preceding span. These values are thenceforth immutable, since new rows are inserted into a table slice only in the current span of rows. This allows for simple and efficient maintenance of the expanded SMDO records by illustrative embodiments, especially when illustrative embodiments store the SMDO record for the preceding span of rows in fast-access memory, such as RAM or flash memory, and do not need to retrieve the SMDO record from slower persistent storage.

Illustrative embodiments extend existing SMDO-based scan optimizations to make use of the extended "preceding" SMDO fields, thereby eliminating scanning and processing of possibly large numbers of SMDO records. The general form of our SMDO scan optimization is as follows; the bolded portion below represents the additional optimization available as a result of maintaining the extended SMDO fields.

For each SMDO record "rec" for the given colname, in reverse order (most recent first):
If the condition for excluding a given span of rows is true for "rec", skip over rec.span;
else add rec.span to list of spans to be scanned.
If the condition for excluding all preceding spans of rows is true for "rec", stop reading SMDO records.
Return list of spans of rows for evaluation of query predicate.

Hence, illustrative embodiments generate a new type of SMDO record, which stores information regarding all previously generated spans of rows. For each SMDO record corresponding to a particular span of rows, illustrative embodiments store the maximum value, minimum value, and Bloom filter for that particular span of rows (e.g., current or most recent) as well as the cumulative maximum value, cumulative minimum value, and cumulative Bloom filter for all spans of rows preceding that particular span of rows in that SMDO record. This is useful when the data is loaded in time (or other) order, which is common for timeseries databases where the data typically arrives in time-sequence order and is queried using highly selective predicates.

For example, if a table has data loaded in order of column "date", then illustrative embodiments terminate the scan of SMDO records for a query, such as "select * from t1 where date>x", once illustrative embodiments find an SMDO record, which corresponds to a particular span of rows, having a stored preceding cumulative maximum value for the date column that is less than or equal to x. It should be noted that in cases where the pattern of queries against a table column would not benefit from a particular field in an SMDO record, illustrative embodiments may omit that particular field from the SMDO record to save space and maintenance time (e.g., in the same way that Bloom filter may not be recorded in existing database systems with SMDO records). Consequently, illustrative embodiments are capable of optimizing database table scans in the presence of ordered data and, thereby, increase database server performance by decreasing SMDO scan times and overall query times.

Thus, illustrative embodiments provide one or more technical solutions that overcome a technical problem with suboptimal database server performance during relational database table scans in the presence of ordered data. As a result, these one or more technical solutions provide a technical effect and practical application in the field of database table scans for data queries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
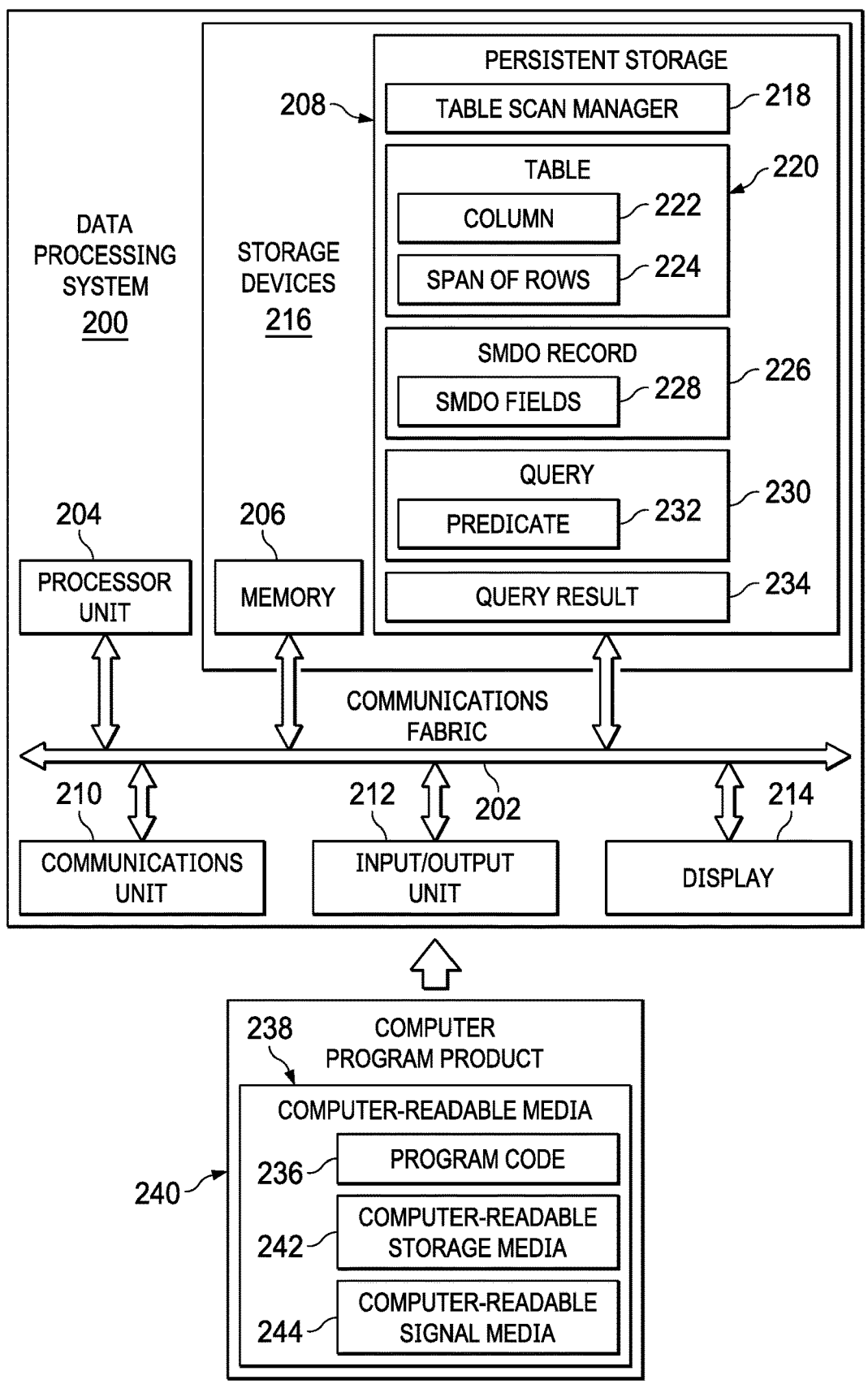
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 are database servers that store data in tables. Also, it should be noted that server 104 and server 106 may each represent a cluster of servers in one or more data centers. Alternatively, server 104 and server 106 may each represent computing nodes in one or more cloud environments.

Client 114, client 116, and client 118 also connect to network 102. Clients 114, 116, and 118 are clients of server 104 and server 106. In this example, clients 114, 116, and 118 are shown as desktop or personal computers with wire communication links to network 102. However, it should be noted that clients 114, 116, and 118 are examples only and may represent other types of data processing systems, such as, for example, network computers, laptop computers, handheld computers, smart phones, smart watches, smart televisions, kiosks, and the like, with wire or wireless communication links to network 102. Users of clients 114, 116, and 118 may utilize clients 114, 116, and 118 to submit data queries to server 104 and server 106. Alternatively, clients may connect to one of server 104 or server 106, that server connecting to the other server (or servers) to implement a distributed database system having subsets (or "shards") of the data associated with different servers.

Storage 108 is a network storage device capable of storing any type of data in a structured format, such as a table. In addition, storage 108 may represent a plurality of network storage devices. Storage 110 and storage 112 are local storage devices connected to server 104 and server 106, respectively, and are also capable of storing any type of data in a structured format. Further, each of storage 108, 110, and 112 may store a set of one or more relational tables of data, a plurality of SMDO records corresponding to spans of rows of data stored in the set of relational tables, and the like. Furthermore, storage 108, 110, and 112 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 114 over network 102 for use on client 114.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores table scan manager 218. However, it should be noted that even though table scan manager 218 is illustrated as residing in persistent storage 208, in an alternative illustrative embodiment table scan manager 218 may be a separate component of data processing system 200. For example, table scan manager 218 may be a hardware component coupled to communication fabric 202 or a combination of hardware and software components.

Table scan manager 218 controls the process of optimizing database table scans in the presence of ordered data. Table 220 represents a relational table of data organized in columns and rows. However, it should be noted that table 220 may represent a plurality of tables stored in persistent storage 208. Column 222 represents a particular column within table 220 containing data that correspond to query 230. However, it should be noted that table 220 may comprise a plurality of columns. In addition, table 220 also is comprised of spans of rows 224. Spans of rows 224 represent a set of one or more spans of rows within table 220. Spans of rows 224 may be logical spans of rows or physical spans of rows.

Table scan manager 218 generates an SMDO record 226 for each span of rows in spans of rows 224 of table 220 for column 222. SMDO record 226 includes SMDO fields 228. SMDO fields 228 represent a plurality of different data fields, such as, for example, a maximum value field that stores a maximum value included in a particular span of rows for column 222, a minimum value field that stores a minimum value included in the particular span of rows for column 222, a Bloom filter field that stores a string of bits corresponding to the particular span of rows for column 222, a cumulative maximum value preceding field that stores a maximum value included in all spans preceding that particular span of rows for column 222, a cumulative minimum value preceding field that stores a minimum value included in all the spans preceding that particular span of rows for column 222, a cumulative Bloom filter preceding field that stores a string of bits for all the spans preceding that particular span of rows for column 222, and the like. However, it should be noted that table scan manager 218 may only receive a subset of SMDO fields 228 for a known query pattern that does not require all of SMDO fields 228.

Query 230 may represent any type of query to retrieve a specified set of data from table 220. Data processing system 200 receives query 230 from a client device, such as, for example, client 114 in FIG. 1, via a network. In this example, query 230 includes predicate 232. Predicate 232 represents a set of one or more conditions for filtering out unwanted data for a result of query 230. Predicate 232 may be, for example, '=' Equal, '< >' Not equal, '<' Less than, '<=' Less than or equal to, '>' Greater than, '>=' Greater than or equal to, or the like.

Query result 234 represents a result of query 230. Table scan manager 218 generates query result 234 based on predicate 232 using one or more SMDO records 226 associated with one or more spans of rows 224 of table 220 for column 222, which corresponds to query 230. Table scan manager 218 sends query result 234 via the network to the client device that sent query 230 to data processing system 200. Alternatively, table scan manager 218 may send its query result to a table scan manager on a different server for merging in a distributed database environment and then sending to the client device.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth© technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 236 is located in a functional form on computer readable media 238 that is selectively removable and may be loaded onto or transferred to data processing system 200 for running by processor unit 204. Program code 236 and computer readable media 238 form computer program product 240. In one example, computer readable media 238 may be computer readable storage media 242 or computer readable signal media 244. Computer readable storage media 242 may include, for example, an optical or magnetic disc that is inserted or placed into a drive or other device that is part of persistent storage 208 for transfer onto a storage device, such as a hard drive, that is part of persistent storage 208. Computer readable storage media 242 also may take the form of a persistent storage, such as a hard drive, a thumb drive, or a flash memory that is connected to data processing system 200. In some instances, computer readable storage media 242 may not be removable from data processing system 200.

Alternatively, program code 236 may be transferred to data processing system 200 using computer readable signal media 244. Computer readable signal media 244 may be, for example, a propagated data signal containing program code 236. For example, computer readable signal media 244 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 236 may be downloaded over a network to persistent storage 208 from another device or data processing system through computer readable signal media 244 for use within data processing system 200. For instance, program code stored in a computer readable storage media in a data processing system may be downloaded over a network from the data processing system to data processing system 200. The data processing system providing program code 236 may be a server computer, a client computer, or some other device capable of storing and transmitting program code 236.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 242 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With reference now to FIG. 3, a diagram illustrating an example of SMDO record information is depicted in accordance with an illustrative embodiment. SMDO record information 300 may be implemented in a computer, such as, for example, server 104 in FIG. 1 or data processing system 200 in FIG. 2. SMDO record information 300 represents information contained within an SMDO record, such as, for example, SMDO record 226 in FIG. 2, which corresponds to a particular span of rows for a column of a table, such as, for example, column 222 and span of rows 224 of table 220 in FIG. 2.

In this example, SMDO record information 300 includes SMDO fields 302, semantics 304, and target query predicate types 306. However, it should be noted that different illustrative embodiments may include more or less information within SMDO record information 300 than shown. SMDO fields 302 may be, for example, SMDO fields 228 in FIG. 2. SMDO fields 302 include max_value 308, min_value 310, Bloom_value 312, max_prec 314, min_prec 316, and Bloom_prec 318.

Semantics 304 provide definitions for each respective field in SMDO fields 302. For example, semantics 304 for max_value 308 are highest non-null value for the column in this span of rows. Semantics 304 for min_value 310 are lowest non-null value for the column in this span of rows. Semantics 304 for Bloom_value 312 are Bloom filter hash values (i.e., string of bits) for the column in this span of rows. Semantics 304 for max_prec 314 are cumulative maximum value for this column over all preceding spans of rows. Semantics 304 for min_prec 316 are cumulative minimum value for this column over all preceding spans of rows. Semantics 304 for Bloom_prec 318 are cumulative Bloom filter hash bits for the column over all preceding spans of rows.

Target query predicate types 306 identify a set of predicate types that benefit from the presence of each respective field in SMDO fields 302. For example, target query predicate types 306 for max_value 308 are =, >, >=, BETWEEN, IN, and equi-join. Target query predicate types 306 for min_value 310 are =, <, <=, BETWEEN, IN, and equi-join. Target query predicate types 306 for Bloom_value 312 are = and IN (for small IN-lists). Target query predicate types 306 for max_prec 314 are =, >, >=, BETWEEN, IN, and equi-join (when column values are mostly in ascending order). Target query predicate types 306 for min_prec 316 are =, <, <=, BETWEEN, IN, and equi-join (when column values are mostly in descending order). Target query predicate types 306 for Bloom_prec 318 are = and IN (for small IN-lists).

Figure 4:
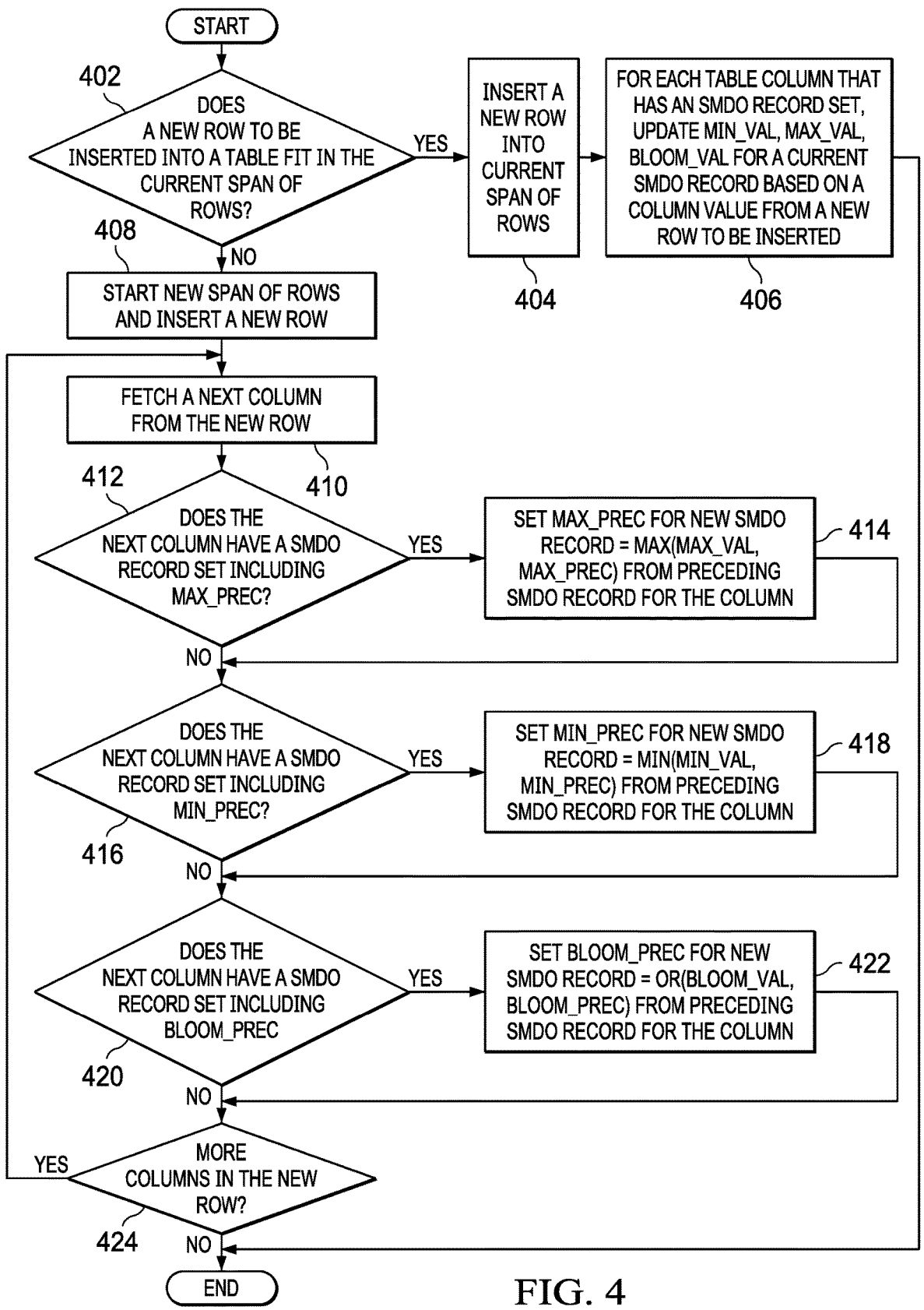
FIG. 4 is a flowchart illustrating a process for updating SMDO records in accordance with an illustrative embodiment.

With reference now to FIG. 4, a flowchart illustrating a process for updating SMDO records is shown in accordance with an illustrative embodiment. The process shown in FIG. 4 may be implemented in a computer, such as, for example, server 104 in FIG. 1 or data processing system 200 in FIG. 2.

The process begins when the computer makes a determination as to whether a new row to be inserted into a table fits in a current span of rows (step 402). If the computer determines that the new row to be inserted into the table does fit in the current span of rows, yes output of step 402, then the computer inserts the new row into the current span of rows (step 404). In addition, for each table column that has an SMDO record set, the computer updates a minimum value, a maximum value, and a Bloom filter value for a current SMDO record based on a column value from the new row inserted into the table (step 406). Thereafter, the process terminates.

Returning again to step 402, if the computer determines that the new row to be inserted into the table does not fit in the current span of rows, no output of step 402, then the computer starts a new span of rows and inserts the new row in the new span of rows (step 408). Further, the computer fetches a next column from the new row (step 410). The computer makes a determination as to whether the next column has an SMDO record set that includes a maximum preceding value (step 412). If the computer determines that the next column does have an SMDO record set that includes a maximum preceding value, yes output of step 412, then the computer sets the maximum preceding value for the SMDO record equal to the greater of the maximum value and the maximum preceding value from a preceding SMDO record for the next column (step 414) and the process proceeds to step 416 thereafter. If the computer determines that the next column does not have an SMDO record set that includes a maximum preceding value, no output of step 412, then the computer makes a determination as to whether the next column has an SMDO record set that includes a minimum preceding value (step 416).

If the computer determines that the next column does have an SMDO record set that includes a minimum preceding value, yes output of step 416, then the computer sets the minimum preceding value for the SMDO record equal to the lesser of the minimum value and the minimum preceding value from the preceding SMDO record for the next column (step 418) and the process proceeds to step 420 thereafter. If the computer determines that the next column does not have an SMDO record set that includes a minimum preceding value, no output of step 416, then the computer makes a determination as to whether the next column has an SMDO record set that includes a Bloom filter preceding value (step 420).

If the computer determines that the next column does have an SMDO record set that includes a Bloom filter preceding value, yes output of step 420, then the computer sets the Bloom filter preceding value for the SMDO record equal to the bitwise OR of the Bloom filter value and the Bloom filter preceding value from the preceding SMDO record for the next column (step 422) and the process proceeds to step 424 thereafter. If the computer determines that the next column does not have an SMDO record set that includes a Bloom filter preceding value, no output of step 420, then the computer makes a determination as to whether another column exists in the new table row (step 424). If the computer determines that another column does exist in the new row, yes output of step 424, then the process returns to step 410 where the computer fetches another column from the new row. If the computer determines that another column does not exist in the new row, no output of step 424, then the process terminates thereafter.

With reference now to FIG. 5, a diagram illustrating an example of SMDO records is shown in accordance with an illustrative embodiment. SMDO records 500 includes a plurality of SMDO records corresponding to a plurality of spans of rows for a given column of a table, such as, for example, spans of rows 224 of table 220 for column 222 in FIG. 2.

In this example, SMDO records 500 include span identifier 502, span maximum "MAX" value 504, cumulative maximum "MAX" value over preceding spans 506, span minimum "MIN" value 508, and cumulative minimum "MIN" value over preceding spans 510. Bloom filter and Bloom filter preceding are not included in this example for brevity.

Span identifier 502 includes identifiers for spans of rows 1 through 10 in reverse order (i.e., most current first (10) at top of list). Each identifier for a respective span of rows is followed by a corresponding span maximum value, a cumulative maximum value over all preceding spans, a span minimum value, and a cumulative minimum value over all preceding spans. With a query, such as query 230 in FIG. 2, for rows where the specified predicate for the column is greater than the current date (which at the time of the query we shall take to be 2019-08-28) minus 5 days, for example, illustrative embodiments only need to scan SMDO records for the spans of rows corresponding to span identifiers 10 and 9. Afterward, illustrative embodiments would scan the spans of rows, themselves, in the table corresponding to span identifiers 10 and 9 for the query result. It should be noted that illustrative embodiments do not scan the SMDO records for the spans of rows corresponding to span identifiers 8 through 1 because illustrative embodiments know, from the SMDO record for span 9, that the maximum value across all of the preceding spans of rows is only 2019-08-20, which is smaller than the current date minus 5 days. Existing systems, without the cumulative maximum and minimum values over preceding spans of rows, would scan all of the SMDO records and compare each maximum column value against the predicate value 2019-08-23 (which is 2019-08-28 minus 5 days) of the query in order to rule out the same spans of rows 8 through 1. This illustrative example shows a very small table slice with only ten spans of rows. In a large database or data warehouse, the number of spans of rows in a table slice may be in the tens of thousands, hundreds of thousands, or more, as data volumes and storage capacities increase. Therefore, the number of SMDO records per table column may be similarly large. As a result, illustrative embodiments provide a benefit for query processing by exploiting information stored in the novel SMDO records of illustrative embodiments, thereby, optimizing SMDO scans and overall scan time for queries.

Figure 6:
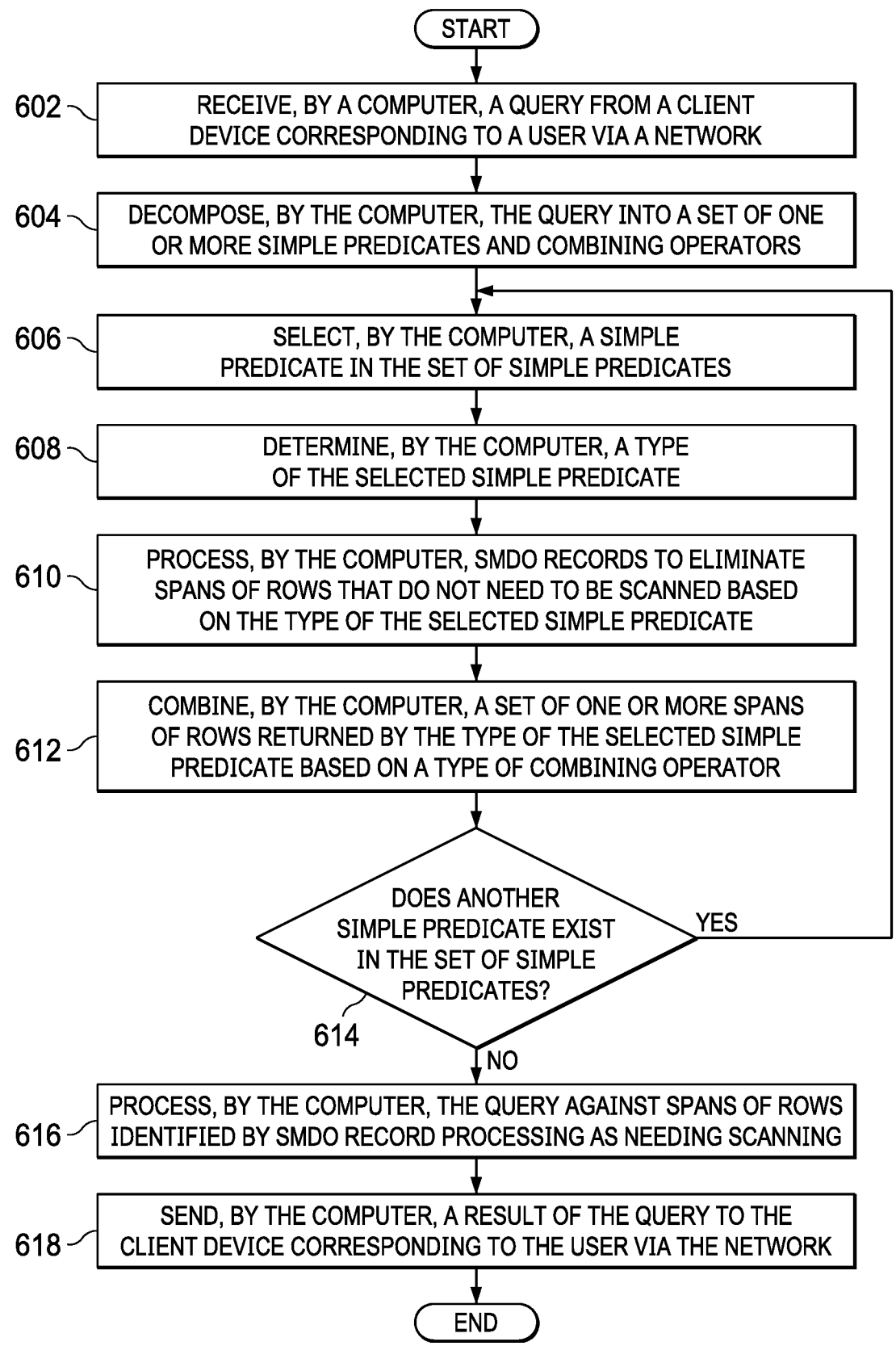
FIG. 6 is a flowchart illustrating a process for processing a query in accordance with an illustrative embodiment.

With reference now to FIG. 6, a flowchart illustrating a process for processing a query is shown in accordance with an illustrative embodiment. The process shown in FIG. 6 may be implemented in a computer, such as, for example, server 104 in FIG. 1 or data processing system 200 in FIG. 2.

The process begins when the computer receives a query from a client device corresponding to a user via a network (step 602). The query may be, for example, query 230 in FIG. 2. The client device and network may be, for example, client 114 and network 102 in FIG. 1.

The computer decomposes the query into a set of one or more simple predicates and combining operators (step 604). The computer selects a simple predicate in the set of simple predicates (step 606). The computer determines a type of the selected simple predicate, such as, for example, an equal to value predicate type, a not equal to value predicate type, a greater than value predicate type, a less than value predicate type, an in list of values predicate type, and the like (step 608).

The computer processes SMDO records to eliminate spans of rows that do not need to be scanned based on the type of the selected simple predicate (step 610). It should be noted that step 610 is performed using the steps in FIGS. 7A-7B. The computer combines a set of one or more spans of rows returned by the type of the selected simple predicate based on a type of combining operator corresponding to the query (step 612). The computer makes a determination as to whether another simple predicate exists in the set of simple predicates (step 614).

If the computer determines that another simple predicate does exist in the set of simple predicates, yes output of step 614, then the process returns to step 606 where the computer selects another simple predicate in the set. If the computer determines that another simple predicate does not exist in the set of simple predicates, no output of step 614, then the computer processes the query against spans of rows identified by SMDO record processing as needing scanning (step 616). The computer sends a result of the query to the client device corresponding to the user via the network (step 618). Thereafter, the process terminates. However, it should be noted that in a distributed or partitioned database system with multiple table slices for a table, the process shown in FIG. 6 for processing a query is performed in parallel against each table slice and then results received from each slice are merged before sending via the network to the client device corresponding to the user.

Figure 7A:
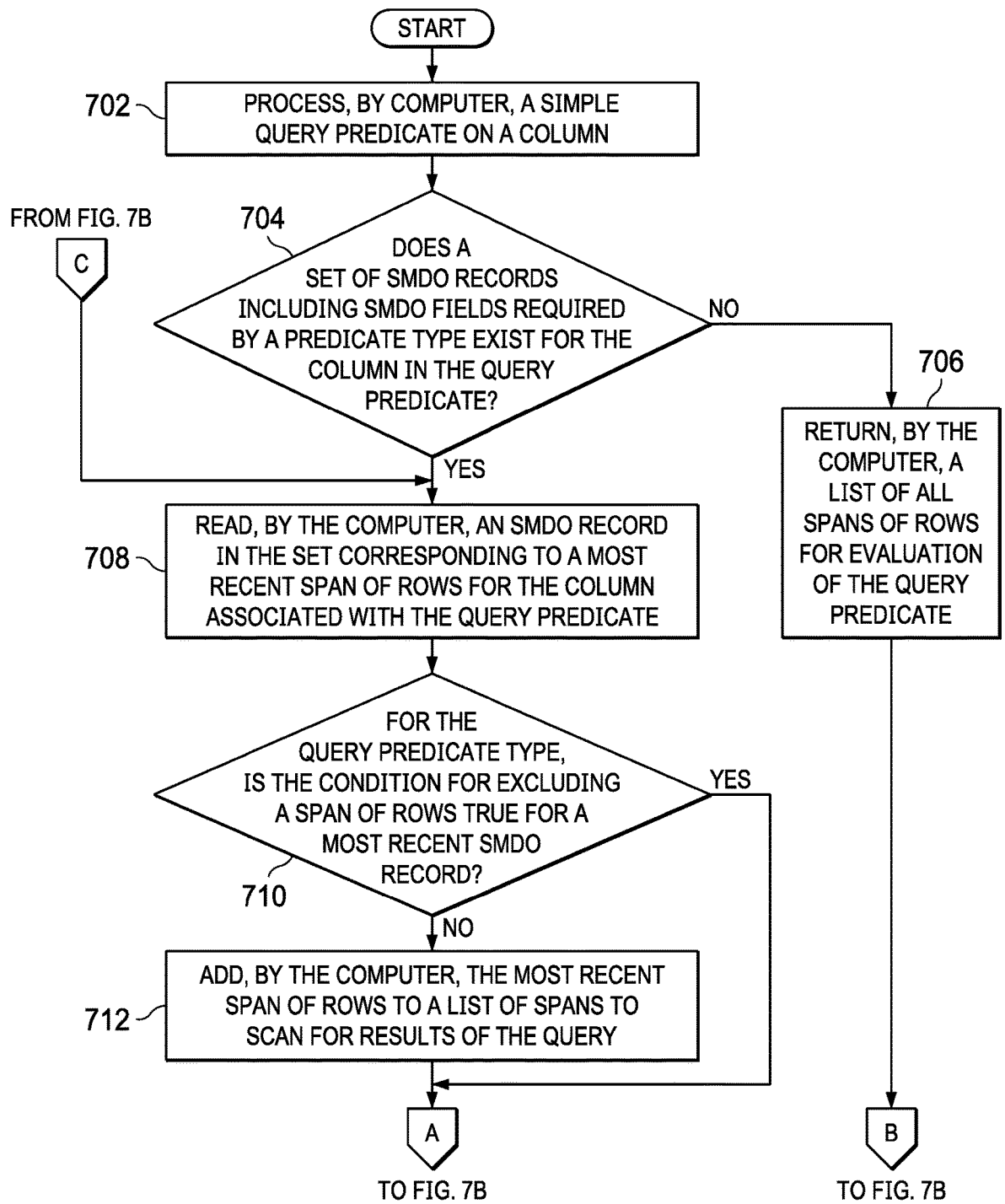
FIGS. 7A-7B are a flowchart illustrating a process for processing a simple query predicate using extended SMDO records in accordance with an illustrative embodiment.
Figure 7B:
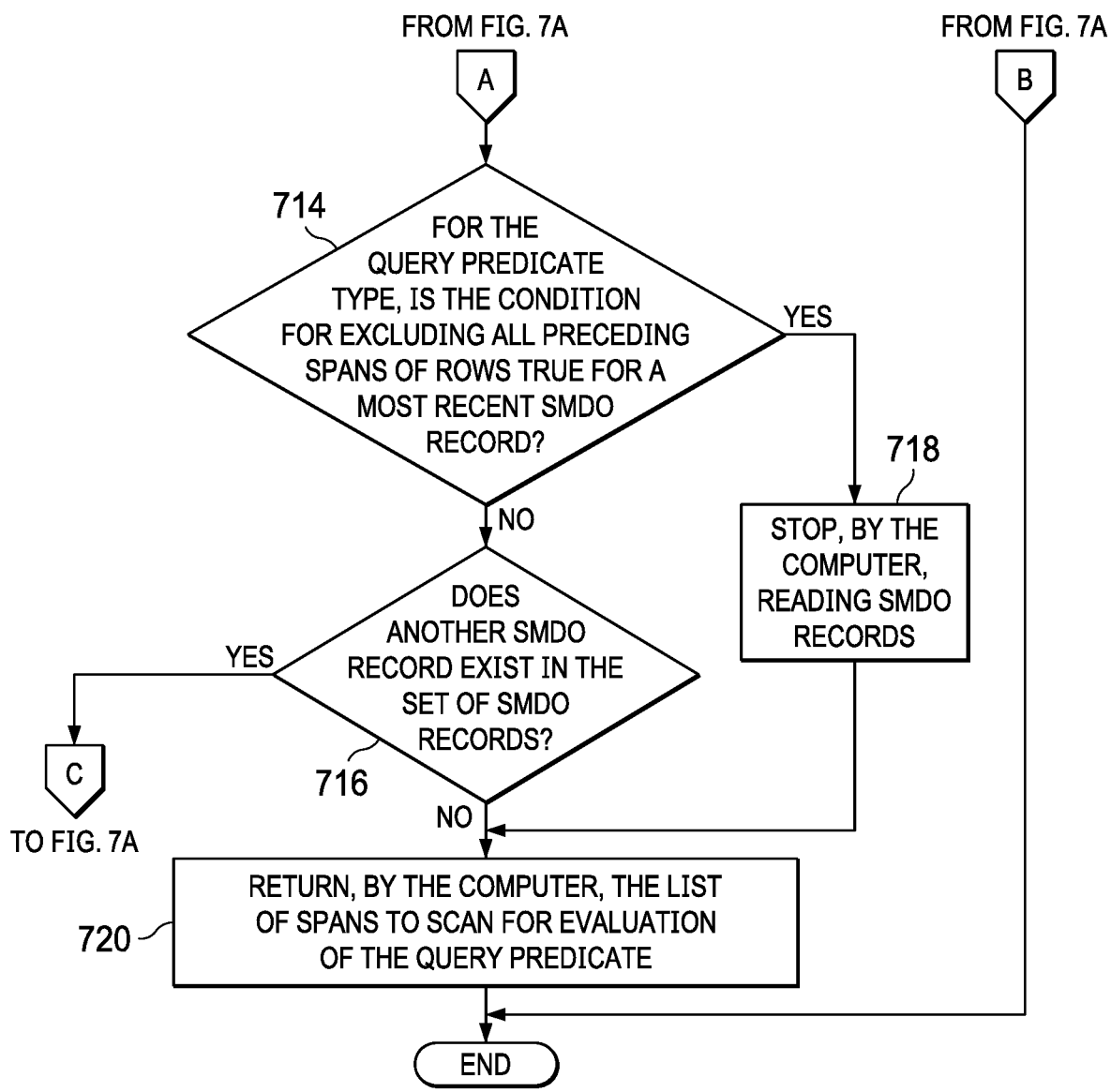

With reference now to FIGS. 7A-7B, a flowchart illustrating a process for processing a simple query predicate using extended SMDO records is shown in accordance with an illustrative embodiment. The process shown in FIGS. 7A-7B may be implemented in a computer, such as, for example, server 104 in FIG. 1 or data processing system 200 in FIG. 2.

The process begins when the computer processes a simple query predicate on a column of a table (step 702). The computer makes a determination as to whether a set of SMDO records exists that includes SMDO fields required by a type of the simple query predicate for a column corresponding to the simple query predicate as specified in FIGS. 8A-8C (step 704). If the computer determines that a set of SMDO records does not exist that includes SMDO fields required by the type of the simple query predicate for the column associated with the simple query predicate, no output of step 704, then the computer returns a list of all spans of rows for evaluation of the simple query predicate (step 706) and the process terminates thereafter. If the computer determines that a set of SMDO records does exist that includes SMDO fields required by the type of the simple query predicate for the column corresponding to the simple query predicate, yes output of step 704, then the computer reads an SMDO record in the set of SMDO records corresponding to a most recent span of rows for the column associated with the simple query predicate (step 708).

The computer makes a determination as to whether a condition for excluding a span of rows is true for the SMDO record corresponding to the most recent span of rows for the column based on the type of the simple query predicate as specified in FIGS. 8A-8C (step 710). If the computer determines that a condition for excluding a span of rows is true for the SMDO record corresponding to the most recent span of rows for the column based on the type of the simple query predicate, yes output of step 710, then the process proceeds to step 714. If the computer determines that a condition for excluding a span of rows is not true for the SMDO record corresponding to the most recent span of rows for the column based on the type of the simple query predicate, no output of step 710, then the computer adds the most recent span of rows to a list of spans of rows to scan for results of the simple query predicate (step 712).

The computer makes a determination as to whether a condition for excluding all preceding spans of rows is true for the SMDO record corresponding to the most recent span of rows for the column based on the type of the simple query predicate as specified in FIGS. 8A-8C (step 714). If the computer determines that a condition for excluding all preceding spans of rows is not true for the SMDO record corresponding to the most recent span of rows for the column based on the type of the simple query predicate, no output of step 714, then the computer makes a determination as to whether another SMDO record exists in the set of SMDO records (step 716). If the computer determines that another SMDO record does exist in the set of SMDO records, yes output of step 716, then the process returns to step 708 where the computer reads the another SMDO record in the set. If the computer determines that another SMDO record does not exist in the set of SMDO records, no output of step 716, then the process proceeds to step 720.

Returning again to step 714, if the computer determines that a condition for excluding all preceding spans of rows is true for the SMDO record corresponding to the most recent span of rows for the column based on the type of the simple query predicate, yes output of step 714, then the computer stops reading the set of SMDO records (step 718). In addition, the computer returns the list of spans of rows to scan for evaluation of the simple query predicate (step 720). Thereafter, the process terminates.

With reference now to FIGS. 8A-8C, a diagram illustrating conditions for extended SMDO record scan optimization of simple query predicates is depicted in accordance with an illustrative embodiment. Conditions for extended SMDO record optimization of query predicates 800 includes query predicate 802, required SMDO fields on colname for SMDO record optimization to be applicable 804, condition for excluding a given span of rows from needing to be scanned 806, condition for excluding all preceding spans of rows from needing to be scanned 808, and benefit 810. Query predicate 802 lists query predicate types. Required SMDO fields on colname for SMDO record optimization to be applicable 804 lists required SMDO record fields on a particular colname for SMDO record optimization for the corresponding query predicate type. Condition for excluding a given span of rows from needing to be scanned 806 lists conditions for excluding a given span of rows from needing to be scanned for the corresponding query predicate type. Condition for excluding all preceding spans of rows from needing to be scanned 808 lists conditions for excluding all preceding spans of rows from needing to be scanned for the corresponding query predicate type. Benefit 810 lists benefits of each extended SMDO record optimization for each particular query predicate type.

It should be noted that many of the conditions in FIGS. 8A-8C for excluding spans of rows do not require that all of the extended SMDO fields max_prec, min_prec, and Bloom_ prec be tracked and available in SMDO records. Some conditions require just Bloom_prec, others require both max_prec and min_prec, while others require only max_prec or min_prec. Also, it should be noted that current database systems do not track max_val without min_val or vice versa. But for the extended SMDO fields, it is quite reasonable to track only max_prec (for a column whose values are mostly in ascending order) or only min_prec (for a column whose values are mostly in descending order) or only Bloom_prec (for a column with a not large number of distinct values, regardless of order).

Figure 9A:
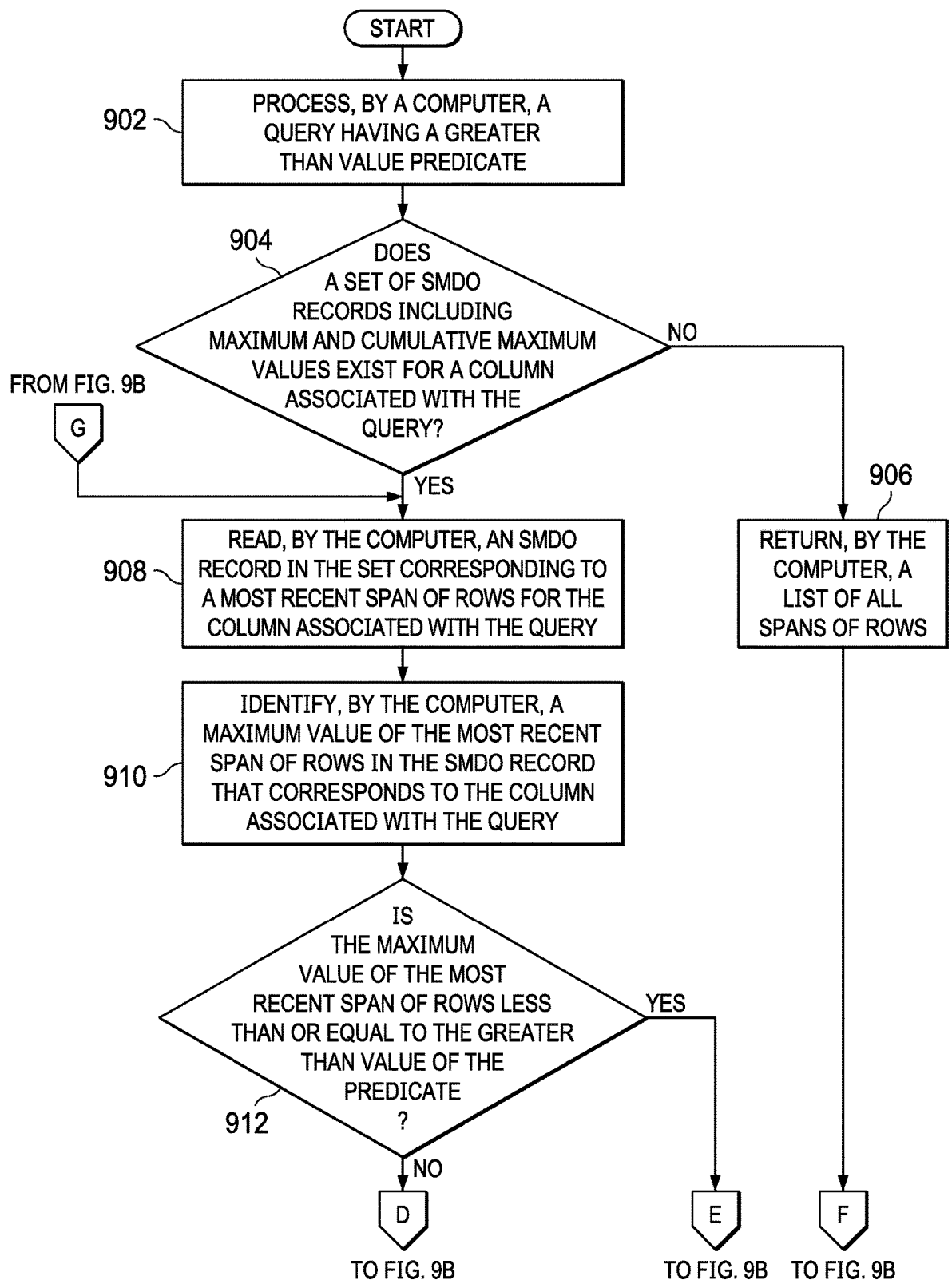
FIGS. 9A-9B are a flowchart illustrating a process for processing a query having a greater than value predicate type in accordance with an illustrative embodiment.
Figure 9B:
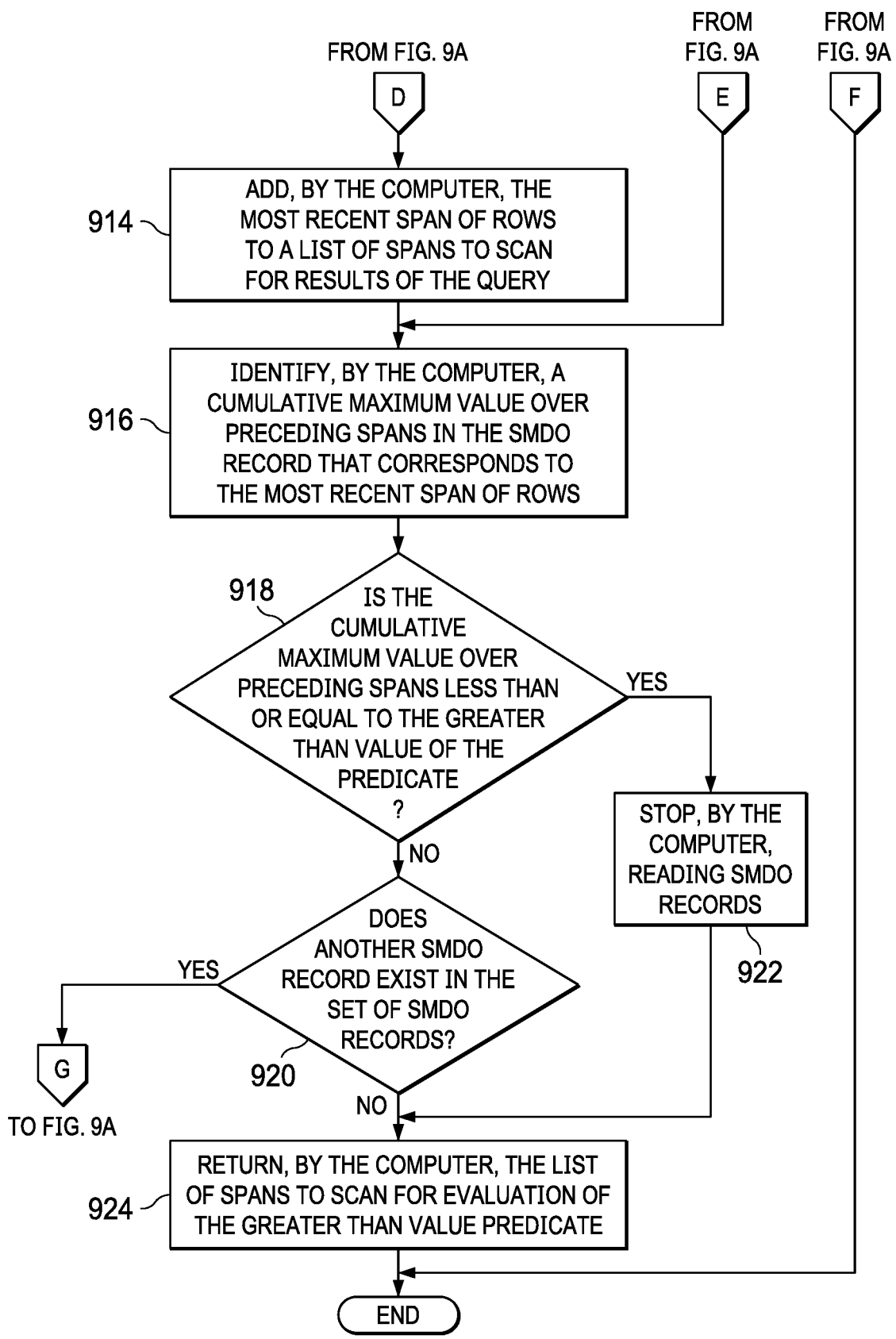

With reference now to FIGS. 9A-9B, a flowchart illustrating a process for processing a query having a greater than value predicate type is shown in accordance with an illustrative embodiment. The process shown in FIGS. 9A-9B may be implemented in a computer, such as, for example, server 104 in FIG. 1 or data processing system 200 in FIG. 2.

The process begins when the computer processes a query having a greater than value predicate (step 902). The computer makes a determination as to whether a set of SMDO records including maximum and cumulative maximum values exists for a column in a table associated with the query (step 904). If the computer determines that a set of SMDO records including maximum and cumulative maximum values does not exist for the column associated with the query, no output of step 904, then the computer returns a list of all spans of rows (step 906) and the process terminates thereafter. If the computer determines that a set of SMDO records including maximum and cumulative maximum values does exist for the column associated with the query, yes output of step 904, then the computer reads an SMDO record in the set corresponding to a most recent span of rows for the column associated with the query (step 908).

In addition, the computer identifies a maximum value of the most recent span of rows in the SMDO record that corresponds to the column associated with the query (step 910). The computer makes a determination as to whether the maximum value of the most recent span of rows is less than or equal to the greater than value of the predicate (step 912). If the computer determines that the maximum value of the most recent span of rows is less than or equal to the greater than value of the predicate, yes output of step 912, then the process proceeds to step 916. If the computer determines that the maximum value of the most recent span of rows is not less than or equal to the greater than value of the predicate, no output of step 912, then the computer adds the most recent span of rows to a list of spans to scan for results of the query (step 914).

Further, the computer identifies a cumulative maximum value over preceding spans in the SMDO record that corresponds to the most recent span of rows (step 916). Furthermore, the computer makes a determination as to whether the cumulative maximum value over preceding spans is less than or equal to the greater than value of the predicate (step 918). If the computer determines that the cumulative maximum value over preceding spans is not less than or equal to the greater than value of the predicate, no output of step 918, then the computer makes a determination as to whether another SMDO record does exist in the set of SMDO records (step 920). If the computer determines that another SMDO record does exist in the set of SMDO records, yes output of step 920, then the process returns to step 908 where the computer selects another SMDO record that corresponds to a next most recent span of rows for the column associated with the query. If the computer determines that another SMDO record does not exist in the set of SMDO records, no output of step 920, then the process proceeds to step 924.

Returning again to step 918, if the computer determines that the cumulative maximum value over preceding spans is less than or equal to the greater than value of the predicate, yes output of step 918, then the computer stops reading SMDO records (step 922). Afterward, the computer returns the list of spans of rows to scan for evaluation of the greater than value predicate (step 924). Thereafter, the process terminates.

Illustrative embodiments also utilize a variant of FIGS. 9A-9B to process a query having a greater than or equal to value predicate. In steps 912 and 918, "less than or equal to the greater than value of the predicate" would be replaced by "less than the greater than or equal to value of the predicate" (as also shown in the conditions for predicate type "co/name>=value" in FIG. 8A).

Figure 10A:
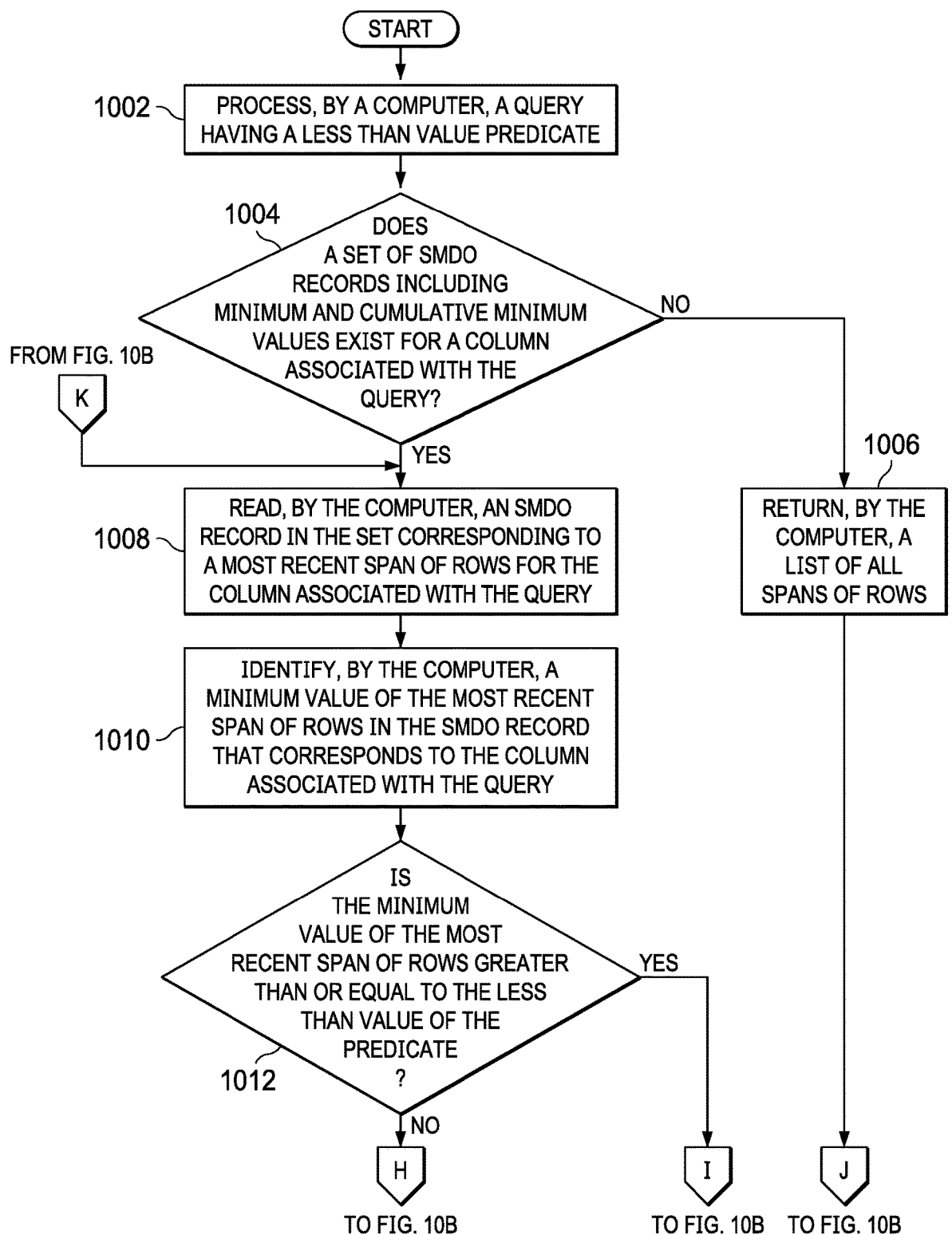
FIGS. 10A-10B are a flowchart illustrating a process for processing a query having a less than value predicate type in accordance with an illustrative embodiment.
Figure 10B:
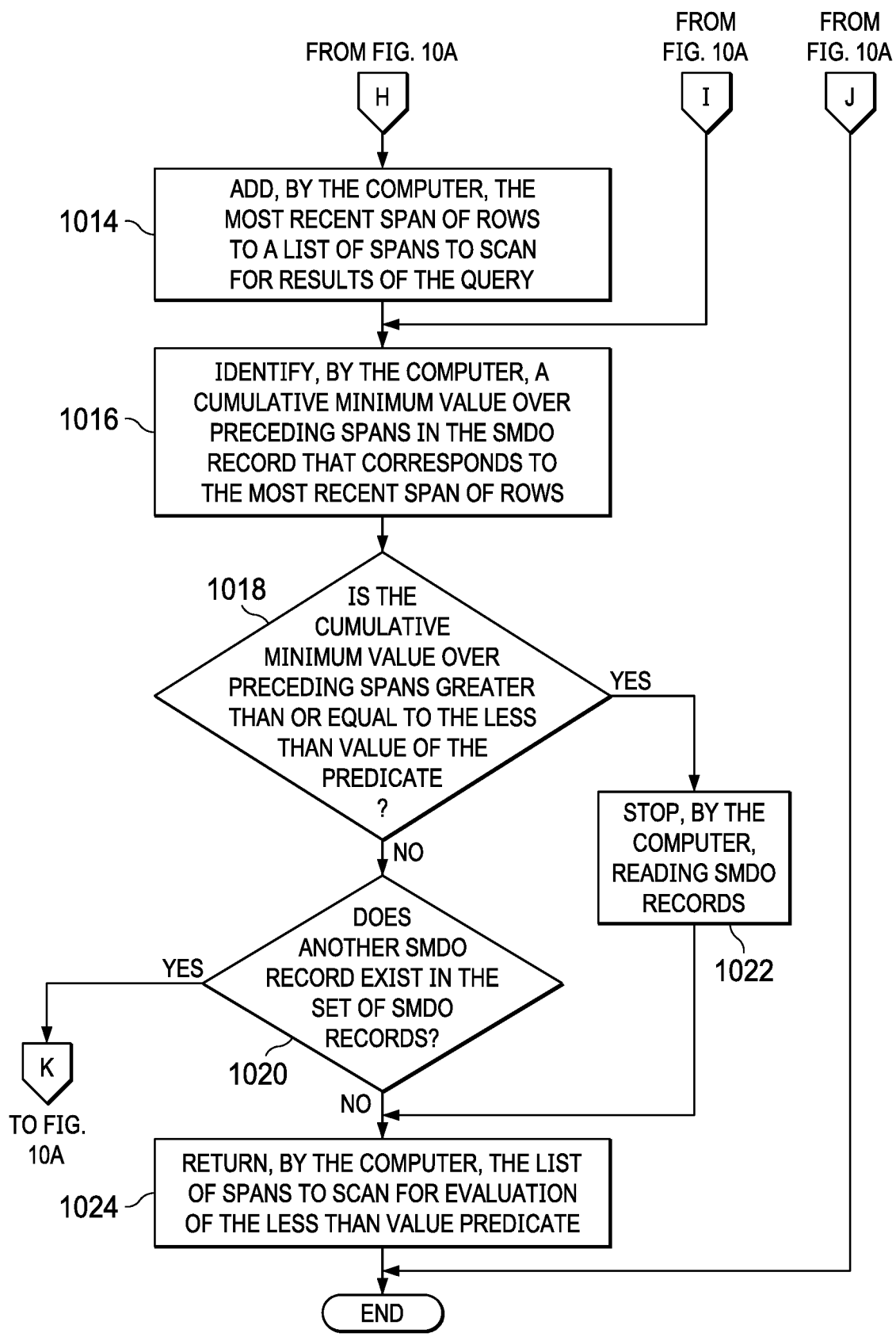

With reference now to FIGS. 10A-10B, a flowchart illustrating a process for processing a query having a less than value predicate type is shown in accordance with an illustrative embodiment. The process shown in FIGS. 10A-10B may be implemented in a computer, such as, for example, server 104 in FIG. 1 or data processing system 200 in FIG. 2.

The process begins when the computer processes a query having a less than value predicate (step 1002). The computer makes a determination as to whether a set of SMDO records including minimum and cumulative minimum values exists for a column in a table associated with the query (step 1004). If the computer determines that a set of SMDO records including minimum and cumulative minimum values does not exist for the column associated with the query, no output of step 1004, then the computer returns a list of all spans of rows (step 1006) and the process terminates thereafter. If the computer determines that a set of SMDO records including minimum and cumulative minimum values does exist for the column associated with the query, yes output of step 1004, then the computer reads an SMDO record in the set of SMDO records corresponding to a most recent span of rows for the column associated with the query (step 1008).

In addition, the computer identifies a minimum value of the most recent span of rows in the SMDO record that corresponds to the column associated with the query (step 1010). The computer makes a determination as to whether the minimum value of the most recent span of rows is greater than or equal to the less than value of the predicate (step 1012). If the computer determines that the minimum value of the most recent span of rows is greater than or equal to the less than value of the predicate, yes output of step 1012, then the process proceeds to step 1016. If the computer determines that the minimum value of the most recent span of rows is not greater than or equal to the less than value of the predicate, no output of step 1012, then the computer adds the most recent span of rows to a list of spans to scan for results of the query (step 1014).

Further, the computer identifies a cumulative minimum value over preceding spans in the SMDO record that corresponds to the most recent span of rows (step 1016). Furthermore, the computer makes a determination as to whether the cumulative minimum value over preceding spans is greater than or equal to the less than value of the predicate (step 1018). If the computer determines that the cumulative minimum value over preceding spans is not greater than or equal to the less than value of the predicate, no output of step 1018, then the computer makes determination as to whether another SMDO record does exist in the set of SMDO records (step 1020). If the computer determines that another SMDO record does exist in the set of SMDO records, yes output of step 1020, then the process returns to step 1008 where the computer selects another SMDO record that corresponds to a next most recent span of rows for the column associated with the query. If the computer determines that another SMDO record does not exist in the set of SMDO records, no output of step 1020, then the process proceeds to step 1024.

Returning again to step 1018, if the computer determines that the cumulative minimum value over preceding spans is greater than or equal to the less than value of the predicate, yes output of step 1018, then the computer stops reading SMDO records (step 1022). Afterward, the computer returns the list of spans of rows to scan for evaluation of the less than value predicate (step 1024). Thereafter, the process terminates.

Illustrative embodiments also utilize a variant of FIGS. 10A-10B to process a query having a less than or equal to value predicate. In steps 1012 and 1018, "greater than or equal to the less than value of the predicate" would be replaced by "greater than the less than or equal to value of the predicate" (as also shown in the conditions for predicate type "co/name<=value" in FIG. 8A).

Figure 11A:
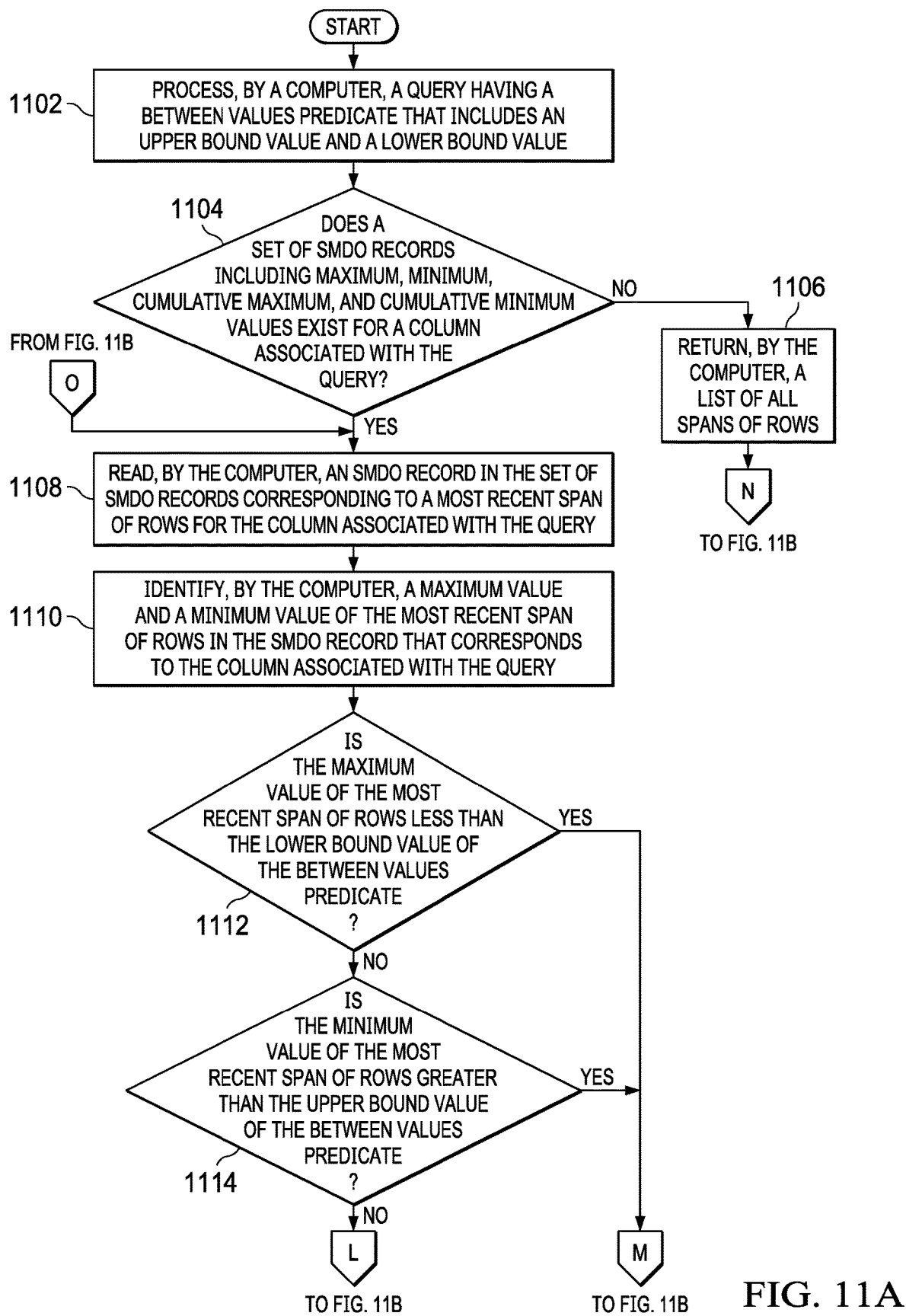
FIGS. 11A-11B are a flowchart illustrating a process for processing a query having a between values predicate type in accordance with an illustrative embodiment.
Figure 11B:
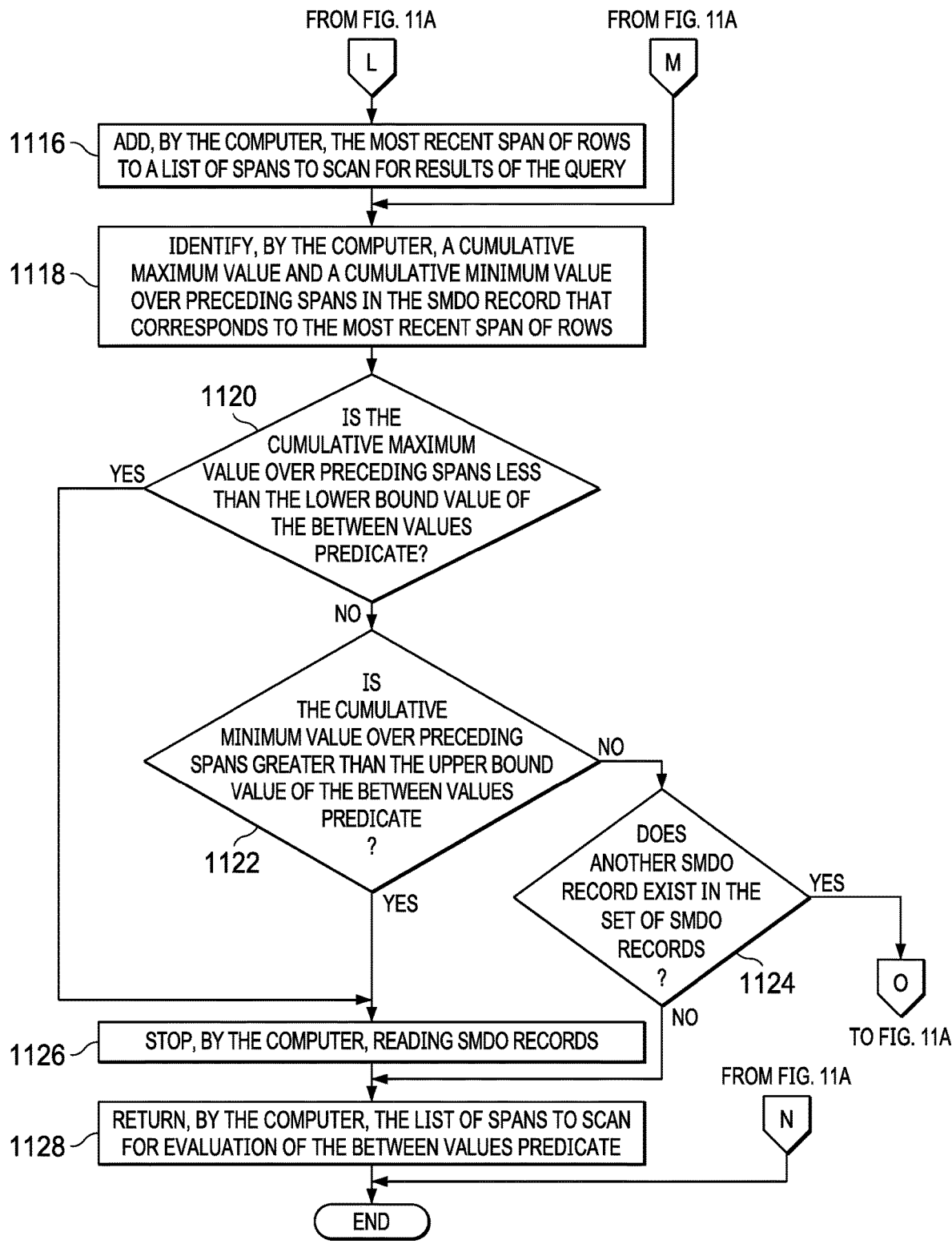

With reference now to FIGS. 11A-11B, a flowchart illustrating a process for processing a query having a between values predicate type is shown in accordance with an illustrative embodiment. The process shown in FIGS. 11A-11B may be implemented in a computer, such as, for example, server 104 in FIG. 1 or data processing system 200 in FIG. 2.

The process begins when the computer processes a query having a between values predicate that includes an upper bound value and a lower bound value (step 1102). The computer makes a determination as to whether a set of SMDO records including maximum, minimum, cumulative maximum, and cumulative minimum values exists for a column in a table associated with the query (step 1104). If the computer determines that a set of SMDO records including maximum, minimum, cumulative maximum, and cumulative minimum values does not exist for the column associated with the query, no output of step 1104, then the computer returns a list of all spans of rows (step 1106) and the process terminates thereafter. If the computer determines that a set of SMDO records including maximum, minimum, cumulative maximum, and cumulative minimum values does exist for the column associated with the query, yes output of step 1104, then the computer reads an SMDO record in the set of SMDO records corresponding to a most recent span of rows for the column associated with the query (step 1108).

In addition, the computer identifies a maximum value and a minimum value of the most recent span of rows in the SMDO record that corresponds to the column associated with the query (step 1110). The computer makes a determination as to whether the maximum value of the most recent span of rows is less than the lower bound value of the between values predicate (step 1112). If the computer determines that the maximum value of the most recent span of rows is less than the lower bound value of the between values predicate, yes output of step 1112, then the process proceeds to step 1118. If the computer determines that the maximum value of the most recent span of rows is not less than the lower bound value of the between values predicate, no output of step 1112, then the computer makes a determination as to whether the minimum value of the most recent span of rows is greater than the upper bound value of the between values predicate (step 1114). If the computer determines that the minimum value of the most recent span of rows is greater than the upper bound value of the between values predicate, yes output of step 1114, then the process proceeds to step 1118. If the computer determines that the minimum value of the most recent span of rows is not greater than the upper bound value of the between values predicate, no output of step 1114, then the computer adds the most recent span of rows to a list of spans to scan for results of the query (step 1116).

Further, the computer identifies a cumulative maximum value and a cumulative minimum value over preceding spans in the SMDO record that corresponds to the most recent span of rows (step 1118). Furthermore, the computer makes a determination as to whether the cumulative maximum value over preceding spans is less than the lower bound value of the between values predicate (step 1120). If the computer determines that the cumulative maximum value over preceding spans is less than the lower bound value of the between values predicate, yes output of step 1120, then the process proceeds to step 1126. If the computer determines that the cumulative maximum value over preceding spans is not less than the lower bound value of the between values predicate, no output of step 1120, then the computer makes a determination as to whether the cumulative minimum value over preceding spans is greater than the upper bound value of the between values predicate (step 1122).

If the computer determines that the cumulative minimum value over preceding spans is not greater than the upper bound value of the between values predicate, no output of step 1122, then the computer makes a determination as to whether another SMDO record does exist in the set of SMDO records (step 1124). If the computer determines that another SMDO record does exist in the set of SMDO records, yes output of step 1124, then the process returns to step 1108 where the computer reads another SMDO record corresponding to a next most recent span of rows for the column. If the computer determines that another SMDO record does not exist in the set of SMDO records, no output of step 1124, then the process proceeds to step 1128.

Returning again to step 1122, if the computer determines that the cumulative minimum value over preceding spans is greater than the upper bound value of the between values predicate, yes output of step 1122, then the computer stops reading SMDO records (step 1126). Afterward, the computer returns the list of spans of rows to scan for evaluation of the between values predicate (step 1128). Thereafter, the process terminates.

Figure 12A:
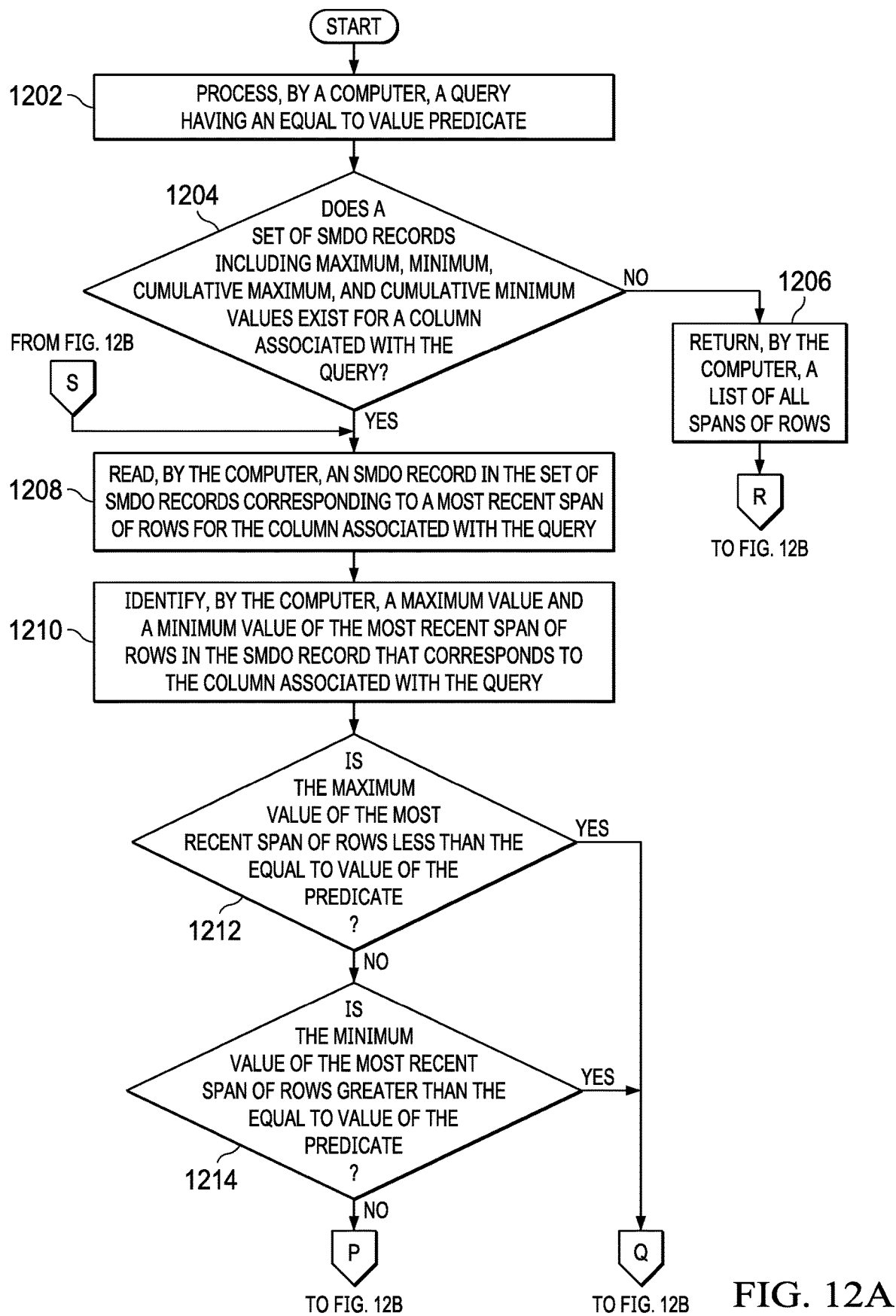
FIGS. 12A-12B are a flowchart illustrating a process for processing a query having an equal to value predicate type in accordance with an illustrative embodiment.
Figure 12B:
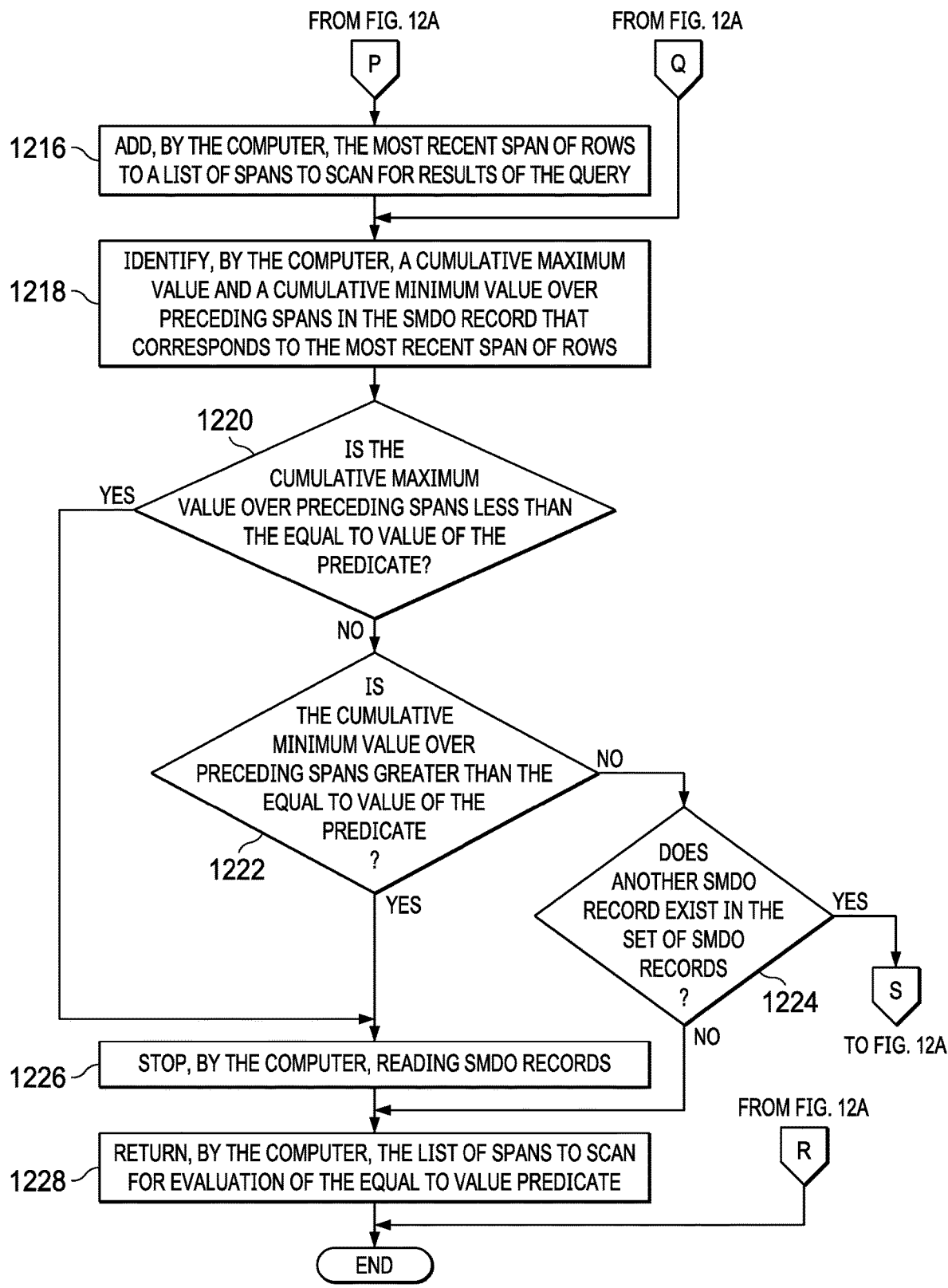

With reference now to FIGS. 12A-12B, a flowchart illustrating a process for processing a query having an equal to value predicate type is shown in accordance with an illustrative embodiment. The process shown in FIGS. 12A-12B may be implemented in a computer, such as, for example, server 104 in FIG. 1 or data processing system 200 in FIG. 2.

The process begins when the computer processes a query having an equal to value predicate (step 1202). The computer makes a determination as to whether a set of SMDO records including maximum, minimum, cumulative maximum, and cumulative minimum values exists for a column in a table associated with the query (step 1204). If the computer determines that a set of SMDO records including maximum, minimum, cumulative maximum, and cumulative minimum values does not exist for the column associated with the query, no output of step 1204, then the computer returns a list of all spans of rows (step 1206) and the process terminates thereafter. If the computer determines that a set of SMDO records including maximum, minimum, cumulative maximum, and cumulative minimum values does exist for the column associated with the query, yes output of step 1204, then the computer reads an SMDO record in the set of SMDO records corresponding to a most recent span of rows for the column associated with the query (step 1208). In addition, the computer identifies a maximum value and a minimum value of the most recent span of rows in the SMDO record that corresponds to the column associated with the query (step 1210).

The computer makes a determination as to whether the maximum value of the most recent span of rows is less than the equal to value of the predicate (step 1212). If the computer determines that the maximum value of the most recent span of rows is less than the equal to value of the predicate, yes output of step 1212, then the process proceeds to step 1218. If the computer determines that the maximum value of the most recent span of rows is not less than the equal to value of the predicate, no output of step 1212, then the computer makes a determination as to whether the minimum value of the most recent span of rows is greater than the equal to value of the predicate (step 1214). If the computer determines that the minimum value of the most recent span of rows is greater than the equal to value of the predicate, yes output of step 1214, then the process proceeds to step 1218. If the computer determines that the minimum value of the most recent span of rows is not greater than the equal to value of the predicate, no output of step 1214, then the computer adds the most recent span of rows to a list of spans to scan for results of the query (step 1216).

Further, the computer identifies a cumulative maximum value and a cumulative minimum value over preceding spans in the SMDO record that corresponds to the most recent span of rows (step 1218). Furthermore, the computer makes a determination as to whether the cumulative maximum value over preceding spans is less than the equal to value of the predicate (step 1220). If the computer determines that the cumulative maximum value over preceding spans is less than the equal to value of the predicate, yes output of step 1220, then the process proceeds to step 1126. If the computer determines that the cumulative maximum value over preceding spans is not less than the equal to value of the predicate, no output of step 1220, then the computer makes a determination as to whether the cumulative minimum value over preceding spans is greater than the equal to value of the predicate (step 1222).

If the computer determines that the cumulative maximum value over preceding spans is not less than the equal to value of the predicate, no output of step 1222, then the computer makes a determination as to whether another SMDO record does exist in the set of SMDO records (step 1224). If the computer determines that another SMDO record does exist in the set of SMDO records, yes output of step 1224, then the process returns to step 1208 where the computer reads another SMDO record corresponding to a next most recent span of rows for the column. If the computer determines that another SMDO record does not exist in the set of SMDO records, no output of step 1224, then the process proceeds to step 1228.

Returning again to step 1222, if the computer determines that the cumulative minimum value over preceding spans is greater than the equal to value of the predicate, yes output of step 1222, then the computer stops reading SMDO records (step 1226). Afterward, the computer returns the list of spans of rows to scan for evaluation of the equal to value predicate (step 1228). Thereafter, the process terminates.

Figure 13A:
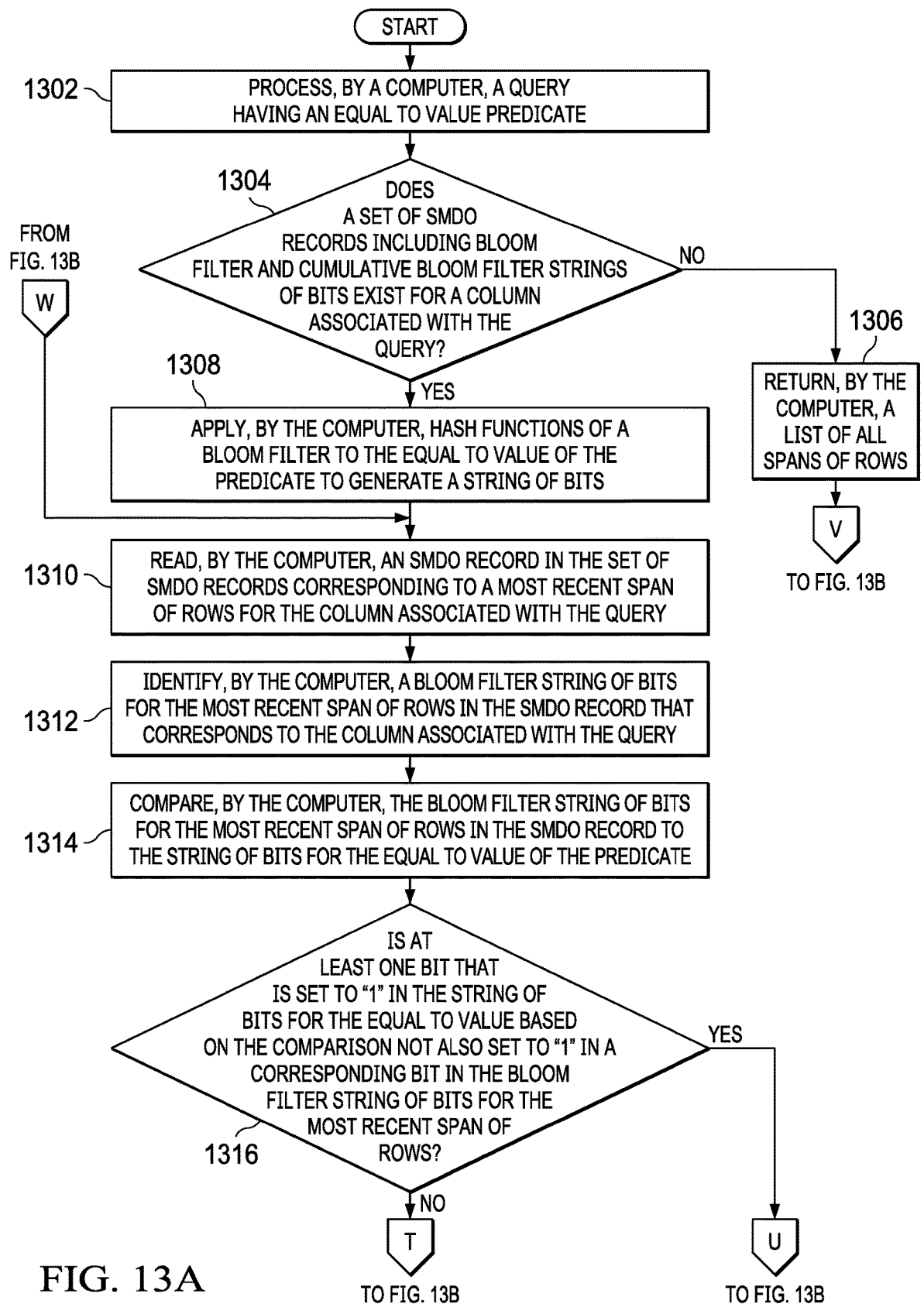
FIGS. 13A-13B are a flowchart illustrating a process for processing a query having an equal to value predicate type using a Bloom filter in accordance with an illustrative embodiment.
Figure 13B:
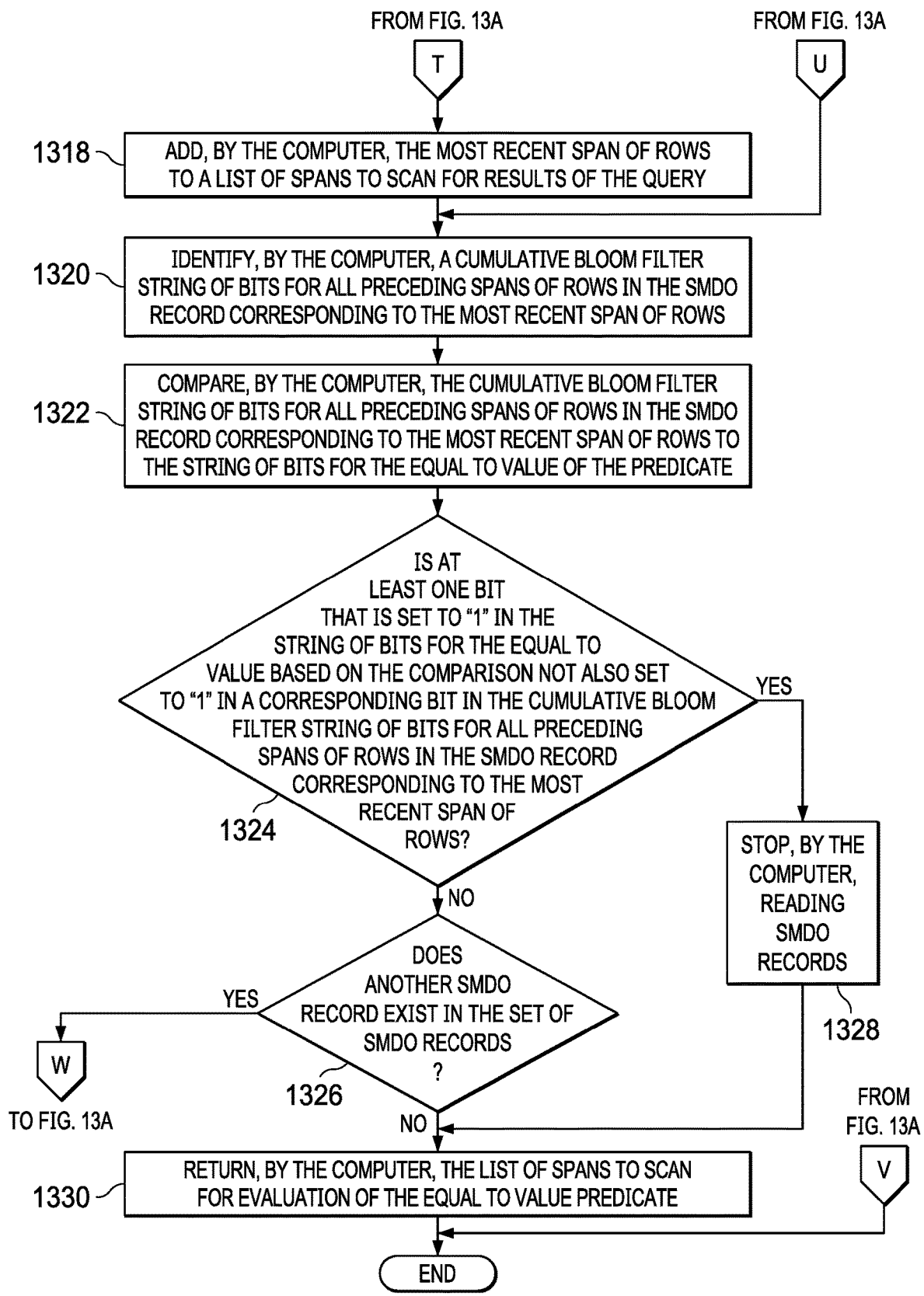

With reference now to FIGS. 13A-13B, a flowchart illustrating a process for processing a query having an equal to value predicate type using a Bloom filter is shown in accordance with an illustrative embodiment. The process shown in FIGS. 13A-13B may be implemented in a computer, such as, for example, server 104 in FIG. 1 or data processing system 200 in FIG. 2.

The process begins when the computer processes a query having an equal to value predicate (step 1302). The computer makes a determination as to whether a set of SMDO records including Bloom filter and cumulative Bloom filter strings of bits exists for a column in a table associated with the query (step 1304). If the computer determines that a set of SMDO records including Bloom filter and cumulative Bloom filter strings of bits does not exist for the column associated with the query, no output of step 1304, then the computer returns a list of all spans of rows (step 1306) and the process terminates thereafter. If the computer determines that a set of SMDO records including Bloom filter and cumulative Bloom filter strings of bits does exist for the column associated with the query, yes output of step 1304, then the computer applies a set of one or more hash functions of a Bloom filter to the equal to value of the predicate to generate a string of bits (step 1308). In addition, the computer reads an SMDO record in the set of SMDO records corresponding to a most recent span of rows for the column associated with the query (step 1310).

The computer identifies a Bloom filter string of bits for the most recent span of rows in the SMDO record that corresponds to the column associated with the query (step 1312). The computer compares the Bloom filter string of bits for the most recent span of rows in the SMDO record to the string of bits for the equal to value of the predicate (step 1314). The computer makes a determination as to whether at least one bit that is set to "1" in the string of bits for the equal to value based on the comparison is not also set to "1" in a corresponding bit in the Bloom filter string of bits for the most recent span of rows (step 1316).

If the computer determines that at least one bit that is set to "1" in the string of bits for the equal to value based on the comparison is not also set to "1" in a corresponding bit in the Bloom filter string of bits for the most recent span of rows, yes output of step 1316, then the process proceeds to step 1320. If the computer determines that all bits that are set to "1" in the string of bits for the equal to value based on the comparison are also set to "1" in corresponding bits in the Bloom filter string of bits for the most recent span of rows, no output of step 1316, then the computer adds the most recent span of rows to a list of spans to scan for results of the query (step 1318). Further, the computer identifies a cumulative Bloom filter string of bits for all previous spans of rows in the SMDO record corresponding to the most recent span of rows (step 1320). Furthermore, the computer compares the cumulative Bloom filter string of bits for all previous spans of rows in the SMDO record corresponding to the most recent span of rows to the string of bits for the equal to value of the predicate (step 1322).

The computer makes a determination as to whether at least one bit that is set to "1" in the string of bits for the equal to value based on the comparison is not also set to "1" in a corresponding bit in the cumulative Bloom filter string of bits for all preceding spans of rows in the SMDO record corresponding to the most recent span of rows (step 1324). If the computer determines that all bits that are set to "1" in the string of bits for the equal to value based on the comparison are also set to "1" in corresponding bits in the cumulative Bloom filter string of bits for all preceding spans of rows in the SMDO record corresponding to the most recent span of rows, no output of step 1324, then the computer makes a determination as to whether another SMDO record exists in the set of SMDO records (step 1326). If the computer determines that another SMDO record does exist in the set of SMDO records, yes output of step 1326, then the process returns to step 1310 where the computer reads another SMDO records corresponding to a next most recent span of rows in the column. If the computer determines that another SMDO record does not exist in the set of SMDO records, no output of step 1326, then the process proceeds to 1330.

Returning again to step 1324, if the computer determines that at least one bit that is set to "1" in the string of bits for the equal to value based on the comparison is not also set to "1" in a corresponding bit in the cumulative Bloom filter string of bits for all preceding spans of rows in the SMDO record corresponding to the most recent span of rows, yes output of step 1324, then the computer stops reading SMDO records (step 1328). Afterward, the computer returns the list of spans of rows to scan for evaluation of the equal to value predicate (step 1330). Thereafter, the process terminates.

Figure 14A:
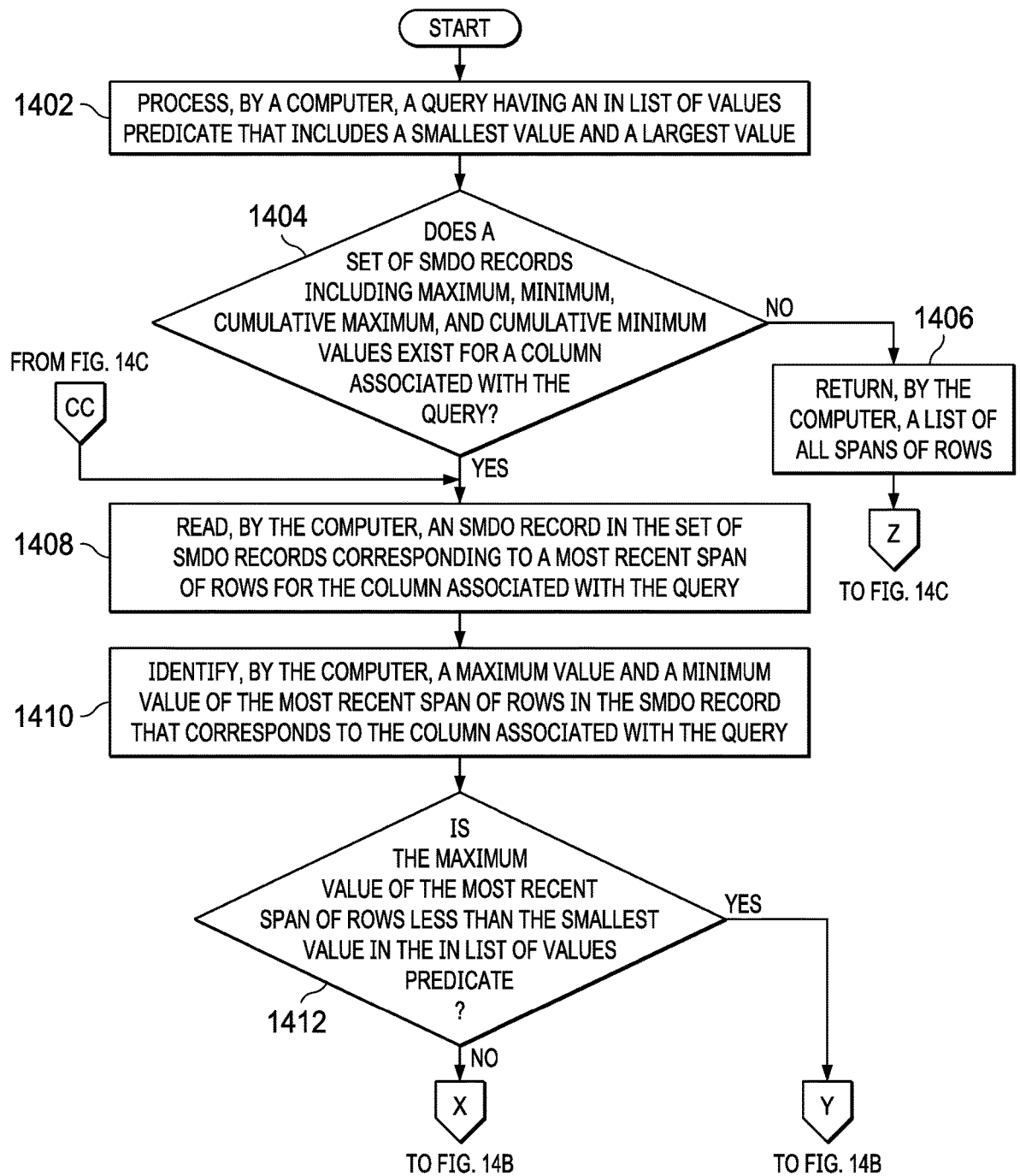
FIGS. 14A-14C are a flowchart illustrating a process for processing a query having an in list of values predicate type in accordance with an illustrative embodiment.
Figure 14B:
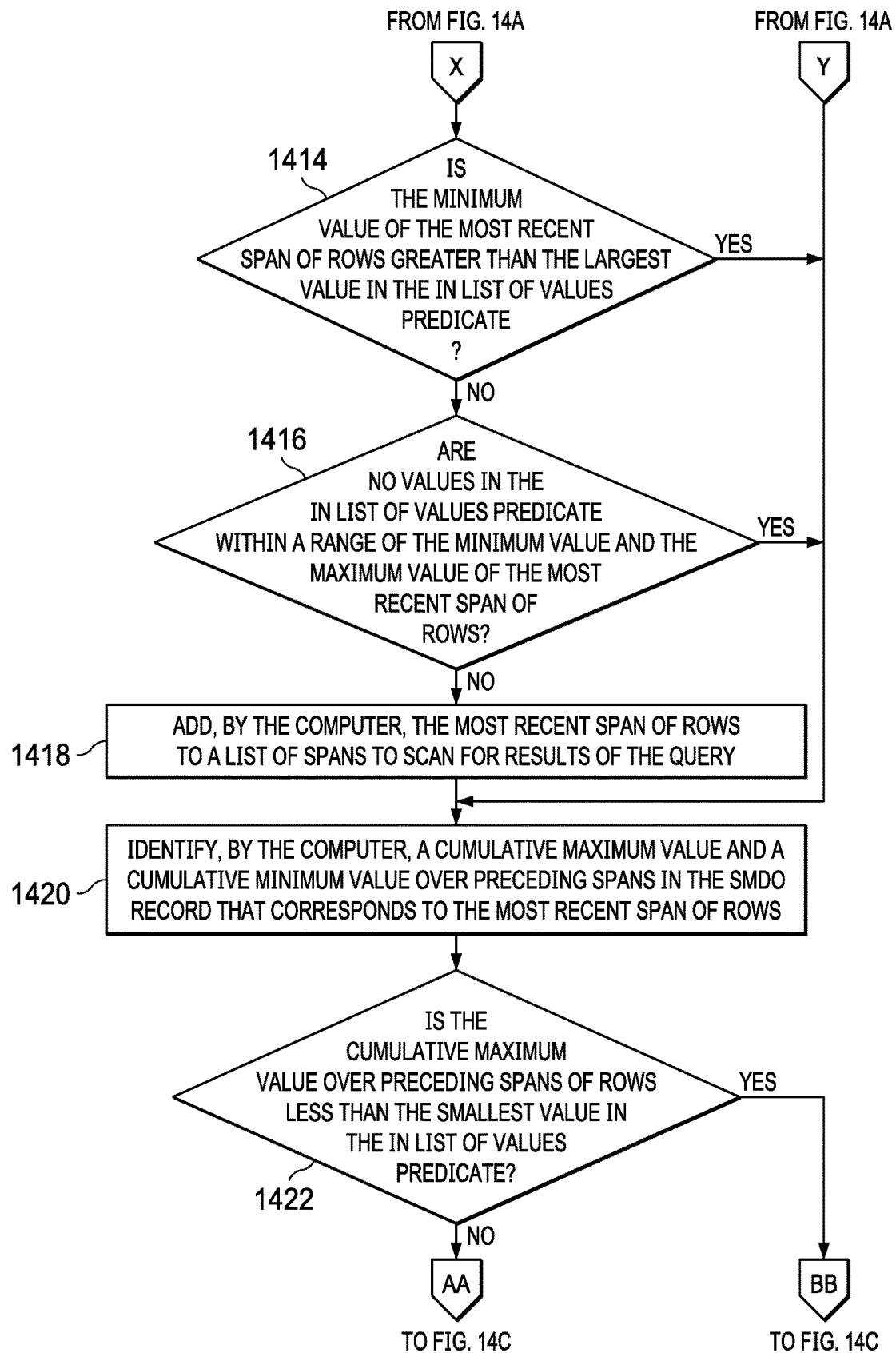
Figure 14C:
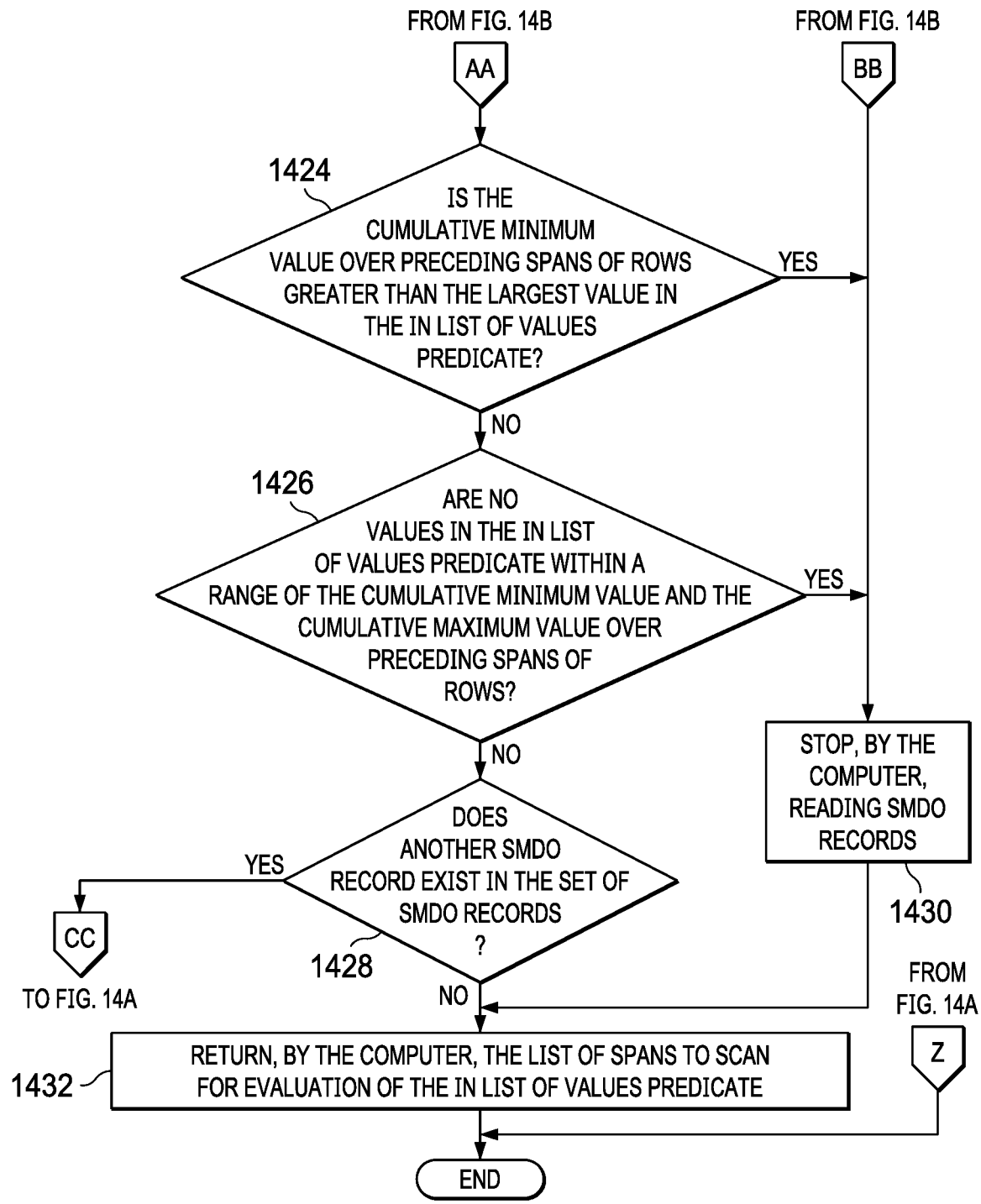

With reference now to FIGS. 14A-14C, a flowchart illustrating a process for processing a query having an in list of values predicate type is shown in accordance with an illustrative embodiment. The process shown in FIGS. 14A-14C may be implemented in a computer, such as, for example, server 104 in FIG. 1 or data processing system 200 in FIG. 2.

The process begins when the computer processes a query having an in list of values predicate that includes a smallest value and a largest value (step 1402). The computer makes a determination as to whether a set of SMDO records including maximum, minimum, cumulative maximum, and cumulative minimum values exists for a column in a table associated with the query (step 1404). If the computer determines that a set of SMDO records including maximum, minimum, cumulative maximum, and cumulative minimum values does not exist for the column associated with the query, no output of step 1404, then the computer returns a list of all spans of rows (step 1406) and the process terminates thereafter. If the computer determines that a set of SMDO records including maximum, minimum, cumulative maximum, and cumulative minimum values does exist for the column associated with the query, yes output of step 1404, then the computer reads an SMDO record in the set of SMDO records corresponding to a most recent span of rows for the column associated with the query (step 1408). In addition, the computer identifies a maximum value and a minimum value of the most recent span of rows in the SMDO record that corresponds to the column associated with the query (step 1410).

The computer makes a determination as to whether the maximum value of the most recent span of rows is less than the smallest value in the in list of values predicate (step 1412). If the computer determines that the maximum value of the most recent span of rows is less than the smallest value in the in list of values predicate, yes output of step 1412, then the process proceeds to step 1420. If the computer determines that the maximum value of the most recent span of rows is not less than the smallest value in the in list of values predicate, no output of step 1412, then the computer makes a determination as to whether the minimum value of the most recent span of rows is greater than the largest value in the in list of values predicate (step 1414). If the computer determines that the minimum value of the most recent span of rows is greater than the largest value in the in list of values predicate, yes output of step 1414, then the process proceeds to step 1420. If the computer determines that the minimum value of the most recent span of rows is not greater than the largest value in the in list of values predicate, no output of step 1414, then the computer makes a determination as to whether no values in the in list of values predicate are within a range of the minimum value and the maximum value of the most recent span of rows (step 1416).

If the computer determines that no values in the in list of values predicate are within a range of the minimum value and the maximum value of the most recent span of rows, yes output of step 1416, then the process proceeds to step 1420. If the computer determines that values in the in list of values predicate are within a range of the minimum value and the maximum value of the most recent span of rows, no output of step 1416, then the computer adds the most recent span of rows to a list of spans to scan for results of the query (step 1418).

Further, the computer identifies a cumulative maximum value and a cumulative minimum value over preceding spans in the SMDO record that corresponds to the most recent span of rows (step 1420). Furthermore, the computer makes a determination as to whether the cumulative maximum value over the preceding spans of rows is less than the smallest value in the in list of values predicate (step 1422). If the computer determines that the cumulative maximum value over the preceding spans of rows is less than the smallest value in the in list of values predicate, yes output of step 1422, then the process proceeds to step 1430. If the computer determines that the cumulative maximum value over the preceding spans of rows is not less than the smallest value in the in list of values predicate, no output of step 1422, then the computer makes a determination as to whether the cumulative minimum value over the preceding spans of rows is greater than the largest value in the in list of values predicate (step 1424).

If the computer determines that the cumulative minimum value over the preceding spans of rows is greater than the largest value in the in list of values predicate, yes output of step 1424, then the process proceeds to step 1430. If the computer determines that the cumulative minimum value over the preceding spans of rows is not greater than the largest value in the in list of values predicate, no output of step 1424, then the computer makes a determination as to whether no values in the in list of values predicate are within a range of the cumulative minimum value and the cumulative maximum value over the preceding spans of rows (step 1426). If the computer determines that values in the in list of values predicate are within a range of the cumulative minimum value and the cumulative maximum value over the preceding spans of rows, no output of step 1426, then the computer makes a determination as to whether another SMDO record exists in the set of SMDO records (step 1428). If the computer determines that another SMDO record does exist in the set of SMDO records, yes output of step 1428, then the process returns to step 1408 where the computer reads another SMDO record corresponding to a next most recent span of rows for the column. If the computer determines that another SMDO record does not exist in the set of SMDO records, no output of step 1428, then the process proceeds to step 1432.

Returning again to step 1426, if the computer determines that no values in the in list of values predicate are within a range of the cumulative minimum value and the cumulative maximum value over the preceding spans of rows, yes output of step 1426, then the computer stops reading SMDO records (step 1430). Afterward, the computer returns the list of spans of rows to scan for evaluation of the in list of values predicate (step 1432). Thereafter, the process terminates.

Figure 15A:
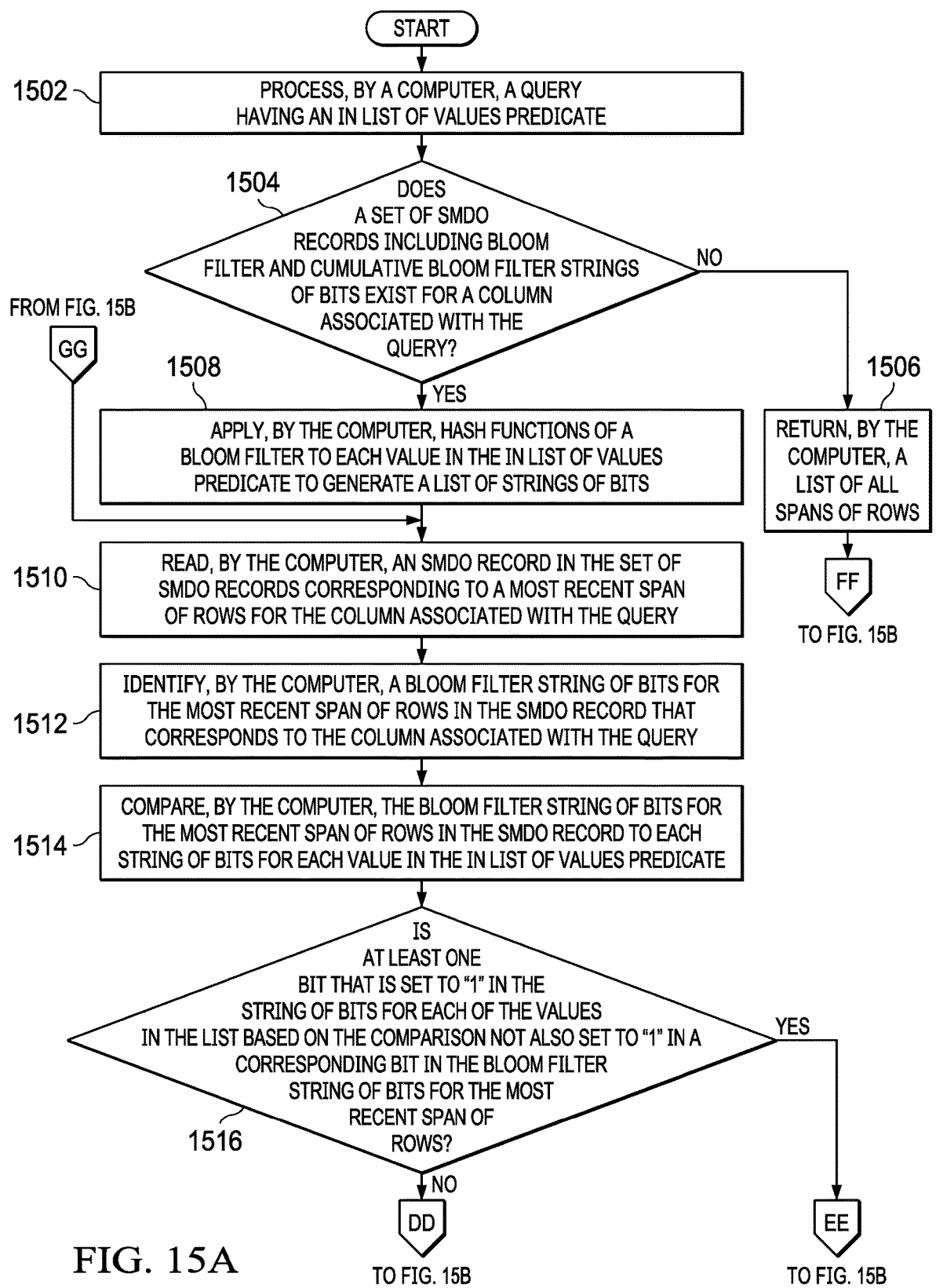
FIGS. 15A-15B are a flowchart illustrating a process for processing a query having an in list of values predicate type using a Bloom filter in accordance with an illustrative embodiment.
Figure 15B:
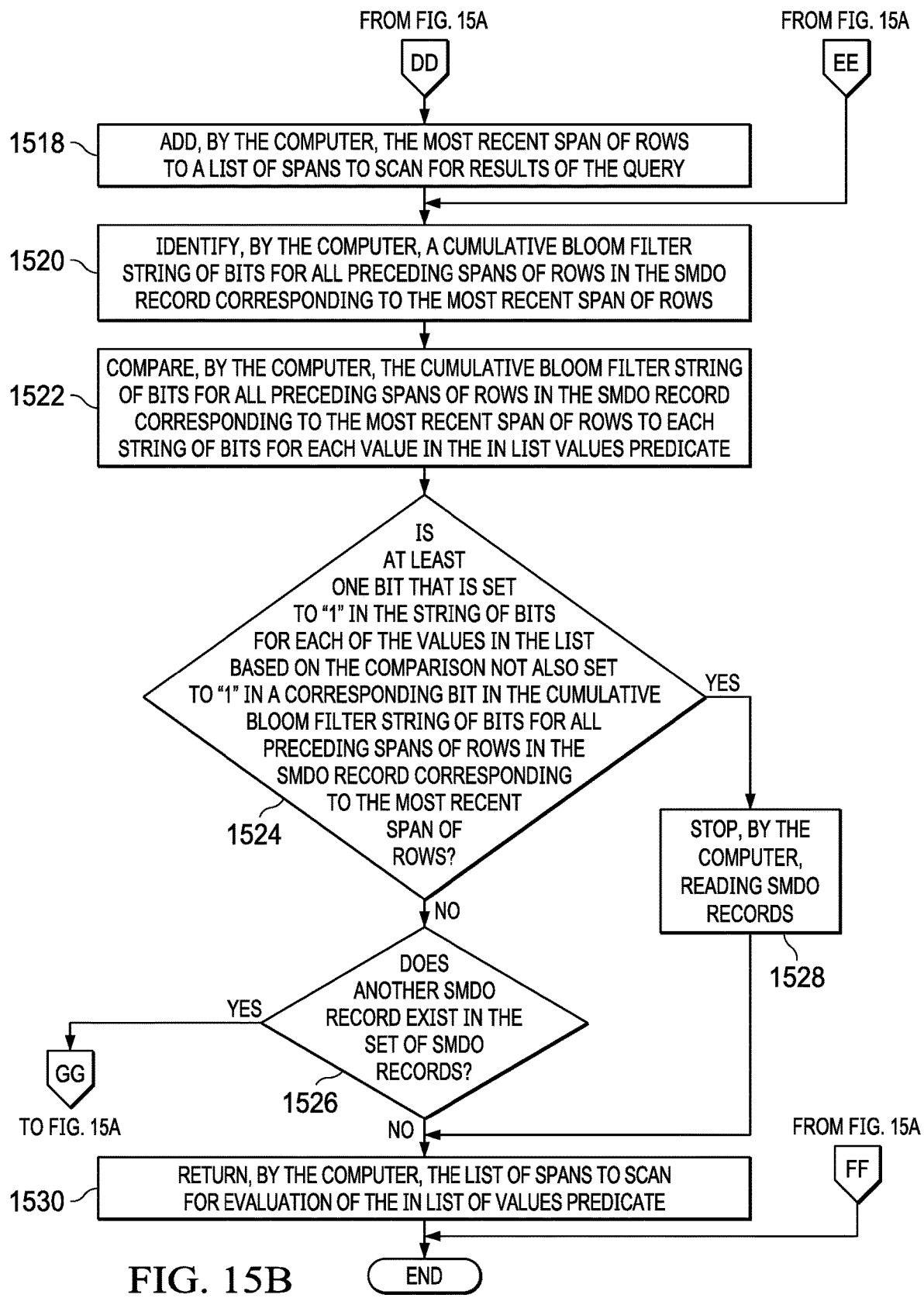

With reference now to FIGS. 15A-15B, a flowchart illustrating a process for processing a query having an in list of values predicate type using a Bloom filter is shown in accordance with an illustrative embodiment. The process shown in FIGS. 15A-15B may be implemented in a computer, such as, for example, server 104 in FIG. 1 or data processing system 200 in FIG. 2.

The process begins when the computer processes a query having an in list of values predicate (step 1502). The computer makes a determination as to whether a set of SMDO records including Bloom filter and cumulative Bloom filter strings of bits exists for a column in a table associated with the query (step 1504). If the computer determines that a set of SMDO records including Bloom filter and cumulative Bloom filter strings of bits does not exist for the column associated with the query, no output of step 1504, then the computer returns a list of all spans of rows (step 1506) and the process terminates thereafter. If the computer determines that a set of SMDO records including Bloom filter and cumulative Bloom filter strings of bits does exist for the column associated with the query, yes output of step 1504, then the computer applies a set of one or more hash functions of a Bloom filter to each value in the in list of values predicate to generate a list of strings of bits (step 1508).

In addition, the computer reads an SMDO record in the set of SMDO records corresponding to a most recent span of rows for the column associated with the query (step 1510). The computer identifies a Bloom filter string of bits for the most recent span of rows in the SMDO record that corresponds to the column associated with the query (step 1512). The computer compares the Bloom filter string of bits for the most recent span of rows in the SMDO record to each string of bits for each value in the in list of values predicate (step 1514).

The computer makes a determination as to whether at least one bit that is set to "1" in a string of bits for at least one value in the in list of values predicate based on the comparison is not also set to "1" in a corresponding bit in the Bloom filter string of bits for the most recent span of rows (step 1516).

If the computer determines that at least one bit that is set to "1" in a string of bits for each value in the in list of values predicate based on the comparison is not also set to "1" in a corresponding bit in the Bloom filter string of bits for the most recent span of rows, yes output of step 1516, then the process proceeds to step 1520. If the computer determines that all bits that are set to "1" in the strings of bits for at least one value in the in list of values predicate based on the comparison are also set to "1" in corresponding bits in the strings of bits in the Bloom filter string of bits for the most recent span of rows, no output of step 1516, then the computer adds the most recent span of rows to a list of spans to scan for results of the query (step 1518). Further, the computer identifies a cumulative Bloom filter string of bits for all preceding spans of rows in the SMDO record corresponding to the most recent span of rows (step 1520). Furthermore, the computer compares the cumulative Bloom filter string of bits for all preceding spans of rows in the SMDO record corresponding to the most recent span of rows to each string of bits for each value in the in list of values predicate (step 1522).

The computer makes a determination as to whether at least one bit that is set to "1" in a string of bits for each value in the in list of values predicate based on the comparison is not also set to "1" in a corresponding bit in the cumulative Bloom filter string of bits for all preceding spans of rows in the SMDO record corresponding to the most recent span of rows (step 1524). If the computer determines that all bits that are set to "1" in the strings of bits for at least one value in the in list of values predicate based on the comparison are also set to "1" in corresponding bits in the cumulative Bloom filter string of bits for all preceding spans of rows in the SMDO record corresponding to the most recent span of rows, no output of step 1524, then the computer makes a determination as to whether another SMDO record exists in the set of SMDO records (step 1526). If the computer determines that another SMDO record does exist in the set of SMDO records, yes output of step 1526, then the process returns to step 1510 where the computer reads another SMDO records corresponding to a next most recent span of rows in the column. If the computer determines that another SMDO record does not exist in the set of SMDO records, no output of step 1526, then the process proceeds to 1530.

Returning again to step 1524, if the computer determines that at least one bit that is set to "1" in a string of bits for each value in the in list of values predicate based on the comparison is not also set to "1" in a corresponding bit in the cumulative Bloom filter string of bits for all preceding spans of rows in the SMDO record corresponding to the most recent span of rows, yes output of step 1524, then the computer stops reading SMDO records (step 1528). Afterward, the computer returns the list of spans of rows to scan for evaluation of the in list of values predicate (step 1530). Thereafter, the process terminates.

Figure 16A:
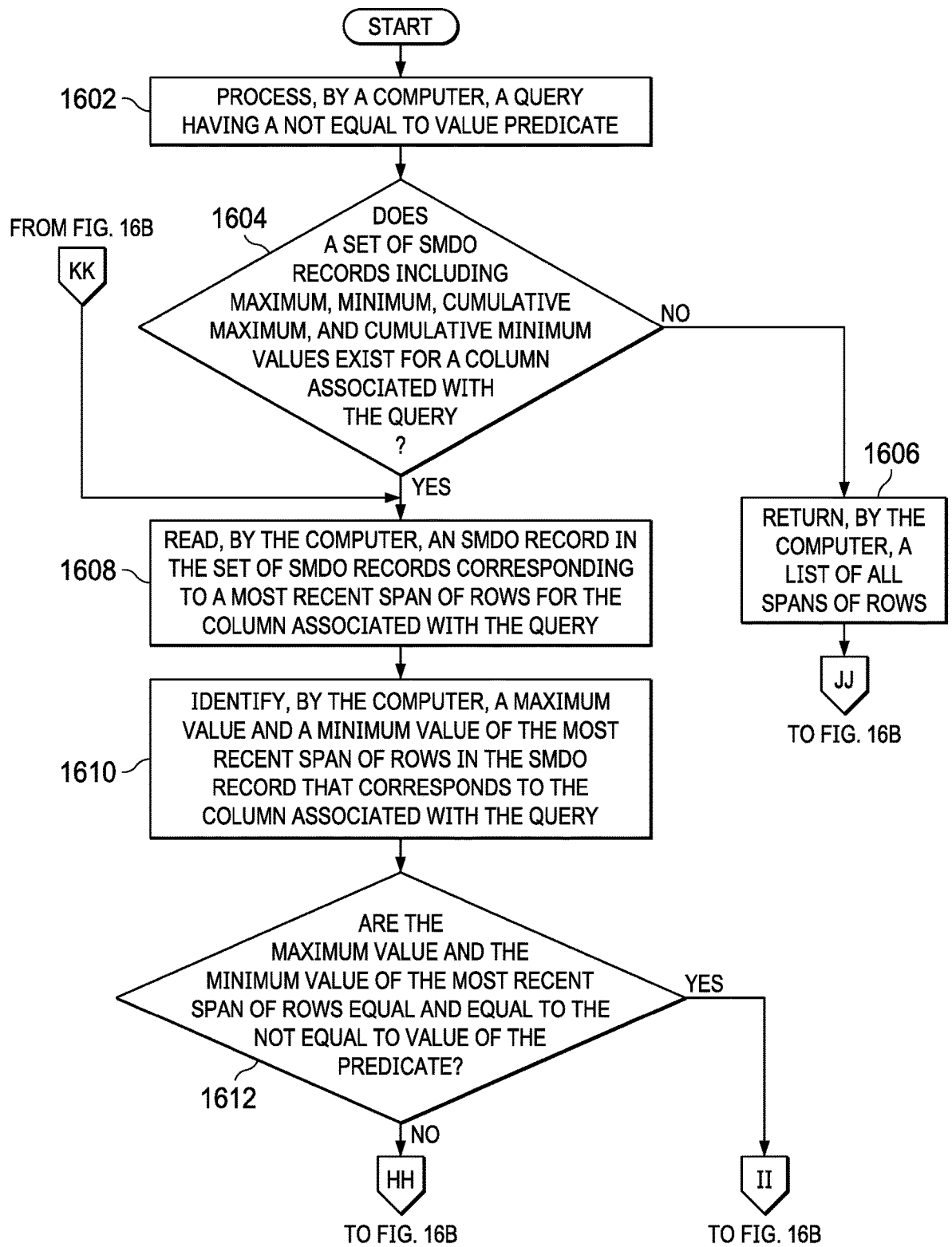
FIGS. 16A-16B are a flowchart illustrating a process for processing a query having a not equal to value predicate type in accordance with an illustrative embodiment.
Figure 16B:
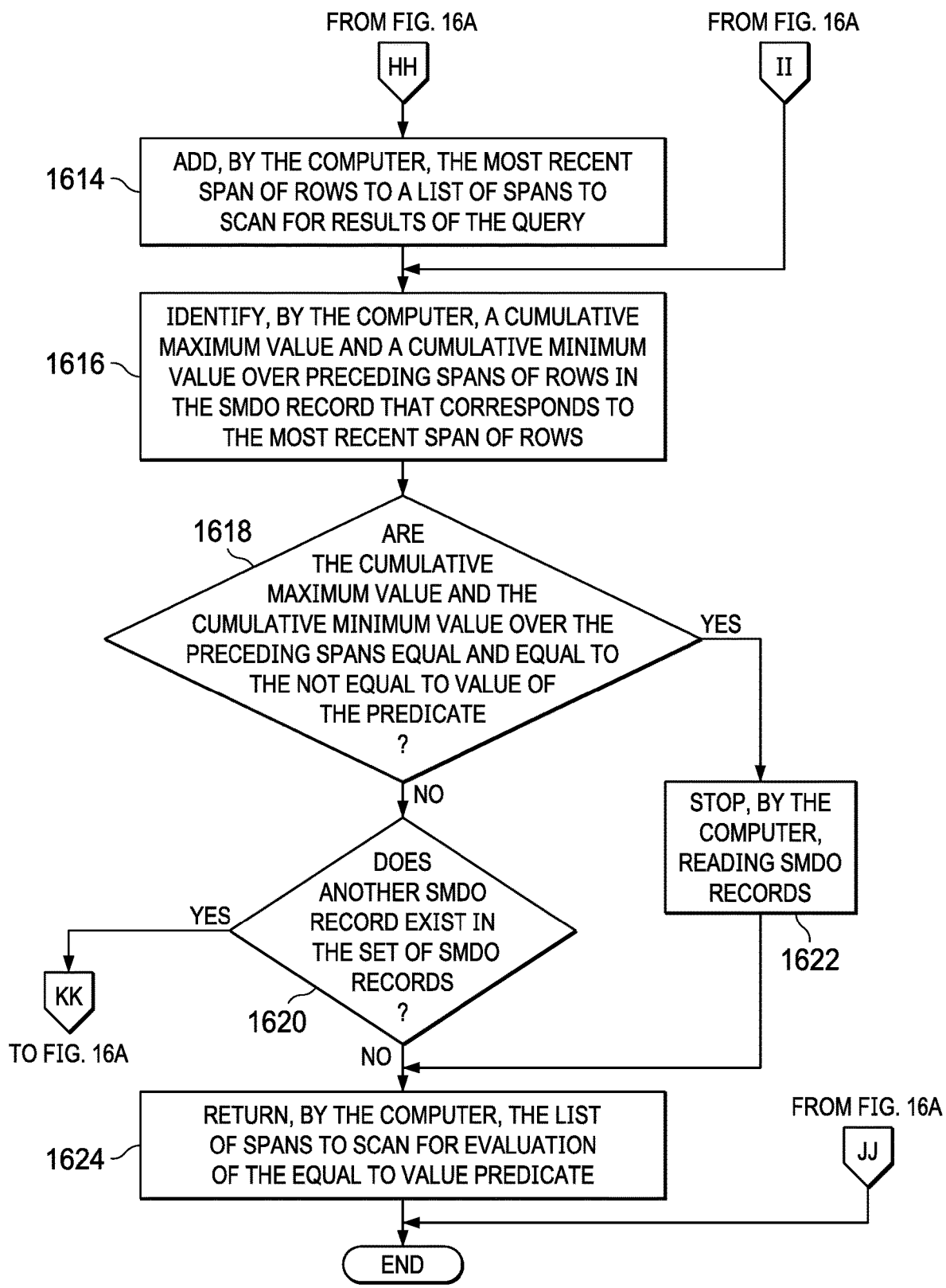

With reference now to FIGS. 16A-16B, a flowchart illustrating a process for processing a query having a not equal to value predicate type is shown in accordance with an illustrative embodiment. The process shown in FIGS. 16A-16B may be implemented in a computer, such as, for example, server 104 in FIG. 1 or data processing system 200 in FIG. 2.

The process begins when the computer processes a query having a not equal to value predicate (step 1602). The computer makes a determination as to whether a set of SMDO records including maximum, minimum, cumulative maximum, and cumulative minimum values exists for a column in a table associated with the query (step 1604). If the computer determines that a set of SMDO records including maximum, minimum, cumulative maximum, and cumulative minimum values does not exist for the column associated with the query, no output of step 1604, then the computer returns a list of all spans of rows (step 1606) and the process terminates thereafter. If the computer determines that a set of SMDO records including maximum, minimum, cumulative maximum, and cumulative minimum values does exist for the column associated with the query, yes output of step 1604, then the computer reads an SMDO record in the set of SMDO records corresponding to a most recent span of rows for the column associated with the query (step 1608). In addition, the computer identifies a maximum value and a minimum value of the most recent span of rows in the SMDO record that corresponds to the column associated with the query (step 1610).

The computer makes a determination as to whether the maximum value and the minimum value of the most recent span of rows are equal and equal to the not equal to value of the predicate (step 1612). If the computer determines that the maximum value and the minimum value of the most recent span of rows are equal and equal to the not equal to value of the predicate, yes output of step 1612, then the process proceeds to step 1616. If the computer determines that the maximum value and the minimum value of the most recent span of rows are not equal or not equal to the not equal to value of the predicate, no output of step 1612, then the computer adds the most recent span of rows to a list of spans to scan for results of the query (step 1614).

Further, the computer identifies a cumulative maximum value and a cumulative minimum value over preceding spans of rows in the SMDO record that corresponds to the most recent span of rows (step 1616). Furthermore, the computer makes a determination as to whether the cumulative maximum value and the cumulative minimum value over the preceding spans of rows are equal and equal to the not equal to value of the predicate (step 1618). If the computer determines that the cumulative maximum value and the cumulative minimum value over the preceding spans of rows are not equal or not equal to the not equal to value of the predicate, no output of step 1618, then the computer makes a determination as to whether another SMDO record exists in the set of SMDO records (step 1620). If the computer determines that another SMDO record does exist in the set of SMDO records, yes output of step 1620, then the process returns to step 1608 where the computer reads another SMDO record corresponding to a next most recent span of rows for the column. If the computer determines that another SMDO record does not exist in the set of SMDO records, no output of step 1620, then the process proceeds to step 1624.

Returning again to step 1618, if the computer determines that the cumulative maximum value and the cumulative minimum value over the preceding spans of rows are equal and equal to the not equal to value of the predicate, yes output of step 1618, then the computer stops reading SMDO records (step 1622). Afterward, the computer returns the list of spans of rows to scan for evaluation of the equal to value predicate (step 1624). Thereafter, the process terminates.

Figure 17A:
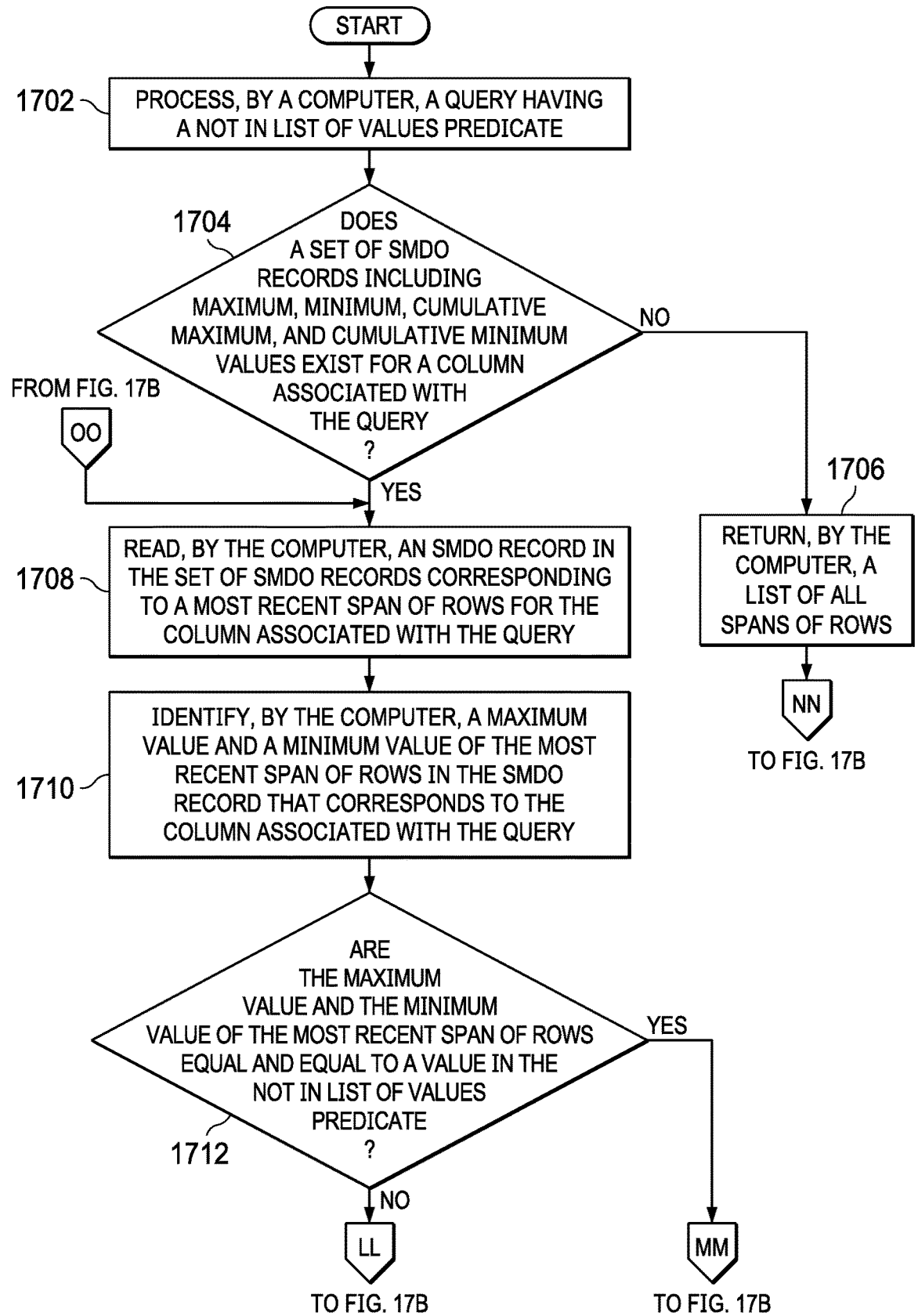
FIGS. 17A-17B are a flowchart illustrating a process for processing a query having a not in list of values predicate type in accordance with an illustrative embodiment.
Figure 17B:
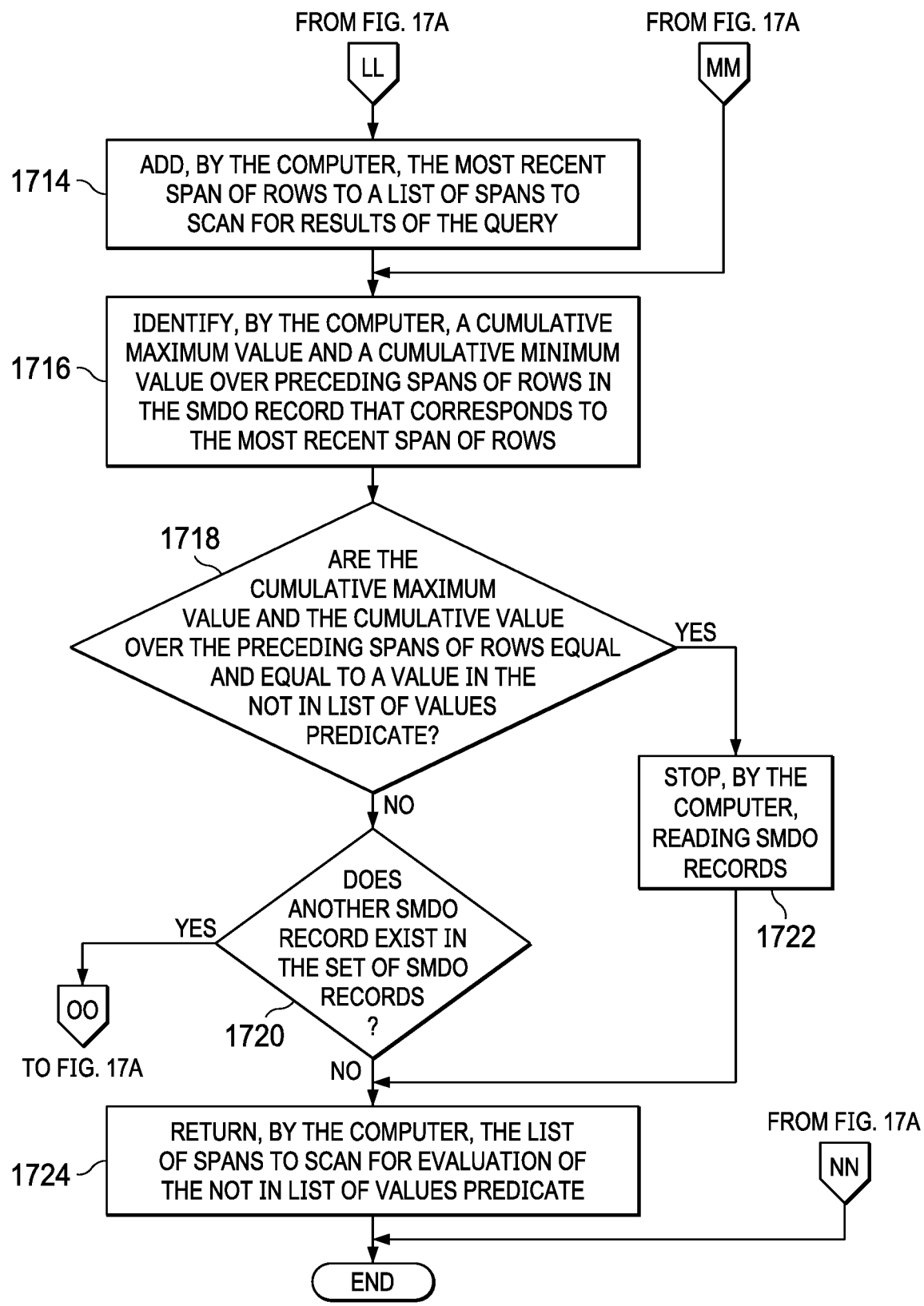

With reference now to FIGS. 17A-17B, a flowchart illustrating a process for processing a query having a not in list of values predicate type is shown in accordance with an illustrative embodiment. The process shown in FIGS. 17A-17B may be implemented in a computer, such as, for example, server 104 in FIG. 1 or data processing system 200 in FIG. 2.

The process begins when the computer processes, a query having a not in list of values predicate (step 1702). The computer makes a determination as to whether a set of SMDO records including maximum, minimum, cumulative maximum, and cumulative minimum values exists for a column in a table associated with the query (step 1704). If the computer determines that a set of SMDO records including maximum, minimum, cumulative maximum, and cumulative minimum values does not exist for the column associated with the query, no output of step 1704, then the computer returns a list of all spans of rows (step 1706) and the process terminates thereafter. If the computer determines that a set of SMDO records including maximum, minimum, cumulative maximum, and cumulative minimum values does exist for the column associated with the query, yes output of step 1704, then the computer reads an SMDO record in the set of SMDO records corresponding to a most recent span of rows for the column associated with the query (step 1708). In addition, the computer identifies a maximum value and a minimum value of the most recent span of rows in the SMDO record that corresponds to the column associated with the query (step 1710).

The computer makes a determination as to whether the maximum value and the minimum value of the most recent span of rows are equal and equal to a value in the not in list of values predicate (step 1712). If the computer determines that the maximum value and the minimum value of the most recent span of rows are equal and equal to a value in the not in list of values predicate, yes output of step 1712, then the process proceeds to step 1716. If the computer determines that the maximum value and the minimum value of the most recent span of rows are not equal or not equal to a value in the not in list of values predicate, no output of step 1712, then the computer adds the most recent span of rows to a list of spans to scan for results of the query (step 1714).

Further, the computer identifies a cumulative maximum value and a cumulative minimum value over preceding spans of rows in the SMDO record that corresponds to the most recent span of rows (step 1716). Furthermore, the computer makes a determination as to whether the cumulative maximum value and the cumulative minimum value over the preceding spans of rows are equal and equal to a value in the not in list of values predicate (step 1718). If the computer determines that the cumulative maximum value and the cumulative minimum value over the preceding spans of rows are not equal or not equal to a value in the not in list of values predicate, no output of step 1718, then the computer makes a determination as to whether another SMDO record exists in the set of SMDO records (step 1720). If the computer determines that another SMDO record does exist in the set of SMDO records, yes output of step 1720, then the process returns to step 1708 where the computer reads another SMDO record corresponding to a next most recent span of rows for the column. If the computer determines that another SMDO record does not exist in the set of SMDO records, no output of step 1720, then the process proceeds to step 1724.

Returning again to step 1718, if the computer determines that the cumulative maximum value and the cumulative minimum value over the preceding spans of rows are equal and equal to a value in the not in list of values predicate, yes output of step 1718, then the computer stops reading SMDO records (step 1722). Afterward, the computer returns the list of spans of rows to scan for evaluation of the not in list of values predicate (step 1724). Thereafter, the process terminates.

Thus, illustrative embodiments of the present invention provide a computer-implemented method, computer system, and computer program product for optimizing database table scans in the presence of ordered data. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing database table scans in a presence of a set of Summarizing Meta-Data Object (SMDO) records that store a maximum value, a minimum value, and a Bloom filter associated with each respective span of rows in a table for a column and that store computed values for cumulative maximum, cumulative minimum, and cumulative Bloom filter for the column over all previously generated spans of rows in the table, the computer-implemented method comprising:

reading, by a computer, an SMDO record in the set of SMDO records corresponding to a most recent span of rows for a column in the table associated with a query predicate, wherein the SMDO record includes SMDO fields required by a type of the query predicate;

(i) determining, by the computer, whether a condition for excluding a span of rows is true for the SMDO record corresponding to the most recent span of rows for the column based on the type of the query predicate;

(ii) responsive to the computer determining that a condition for excluding a span of rows is not true for the SMDO record corresponding to the most recent span of rows for the column based on the type of the query predicate, adding, by the computer, the most recent span of rows to a list of spans of rows to scan for results of the query predicate;

(iii) determining, by the computer, whether a condition for excluding all preceding spans of rows is true for the SMDO record corresponding to the most recent span of rows for the column based on the type of the query predicate;

(iv) responsive to the computer determining that a condition for excluding all preceding spans of rows is true for the SMDO record corresponding to the most recent span of rows for the column based on the type of the query predicate, stopping, by the computer, reading the set of SMDO records; and (v) responsive to the computer determining that a condition for excluding all preceding spans of rows is not true for the SMDO record corresponding to the most recent span of rows for the column based on the type of the query predicate, reading, by the computer, another SMDO record in the set of SMDO records corresponding to a next most recent span of rows for the column in the table associated with the query predicate and repeating steps (i)-(v) with the another SMDO record being used as the SMDO record recited in steps (i)-(v).

2. The computer-implemented method of claim 1 further comprising:

determining, by the computer, whether a new row to be inserted into the table fits in a current span of rows;

responsive to the computer determining that the new row to be inserted into the table does fit in the current span of rows, inserting, by the computer, the new row into the current span of rows;

for each table column that has an SMDO record set, updating, by the computer, a minimum value, a maximum value, and a Bloom filter value for a current SMDO record based on a column value from the new row inserted into the table;

responsive to the computer determining that the new row to be inserted into the table does not fit in the current span of rows, starting, by the computer, a new span of rows and inserting, by the computer, the new row in the new span of rows;

fetching, by the computer, a next column from the new row;

determining, by the computer, whether the next column has an SMDO record set that includes a maximum preceding value;

responsive to the computer determining that the next column does have an SMDO record set that includes a maximum preceding value, setting, by the computer, the maximum preceding value for the SMDO record equal to the greater of the maximum value and the maximum preceding value from a preceding SMDO record for the next column;

determining, by the computer whether the next column has an SMDO record set that includes a minimum preceding value;

responsive to the computer determining that the next column does have an SMDO record set that includes a minimum preceding value, setting, by the computer, the minimum preceding value for the SMDO record equal to the lesser of the minimum value and the minimum preceding value from the preceding SMDO record for the next column;

determining, by the computer whether the next column has an SMDO record set that includes a Bloom filter preceding value; and responsive to the computer determining that the next column does have an SMDO record set that includes a Bloom filter preceding value, setting, by the computer, the Bloom filter preceding value for the SMDO record equal to bitwise OR of the Bloom filter value and the Bloom filter preceding value from the preceding SMDO record for the next column.

3. The computer-implemented method of claim 1 further comprising:

receiving, by the computer, a query from a client device via a network;

decomposing, by the computer, the query into a set of simple predicates;

selecting, by the computer, a simple predicate in the set of simple predicates;

determining, by the computer, a type of the selected simple predicate;

processing, by the computer, SMDO records to eliminate spans of rows that do not need to be scanned based on the type of the selected simple predicate;

combining, by the computer, a set of spans of rows returned by the type of the selected simple predicate based on a type of combining operator corresponding to the query; and processing, by the computer, the query against spans of rows identified by SMDO record processing as needing scanning.

4. The computer-implemented method of claim 1 further comprising:

processing, by the computer, a query having a greater than value predicate;

(vi) identifying, by the computer, a maximum value of the most recent span of rows in the SMDO record that corresponds to the column associated with the query;

(vii) determining, by the computer, whether the maximum value of the most recent span of rows is less than or equal to the greater than value of the predicate;

(viii) responsive to the computer determining that the maximum value of the most recent span of rows is not less than or equal to the greater than value of the predicate, adding, by the computer, the most recent span of rows to the list of spans of rows to scan for results of the query;

(ix) identifying, by the computer, a cumulative maximum value over preceding spans in the SMDO record that corresponds to the most recent span of rows;

(x) determining, by the computer, whether the cumulative maximum value over preceding spans is less than or equal to the greater than value of the predicate;

(xi) responsive to the computer determining that the cumulative maximum value over preceding spans is less than or equal to the greater than value of the predicate, stopping, by the computer, reading the set of SMDO records corresponding to the column associated with the query; and (xii) responsive to the computer determining that the cumulative maximum value over preceding spans is not less than or equal to the greater than value of the predicate, reading, by the computer, another SMDO record in the set of SMDO records corresponding to a next most recent span of rows for the column associated with the query and repeating steps (vi)-(xii) with the another SMDO record being used as the SMDO record recited in steps (vi)-(xii).

5. The computer-implemented method of claim 1 further comprising:

processing, by the computer, a query having a less than value predicate;

(vi) identifying, by the computer, the minimum value of the most recent span of rows in the SMDO record that corresponds to the column associated with the query;

(vii) determining, by the computer, whether the minimum value of the most recent span of rows is greater than or equal to the less than value of the predicate;

(viii) responsive to the computer determining that the minimum value of the most recent span of rows is not greater than or equal to the less than value of the predicate, adding, by the computer, the most recent span of rows to the list of spans of rows to scan for results of the query;

(ix) identifying, by the computer, a cumulative minimum value over preceding spans in the SMDO record that corresponds to the most recent span of rows;

(x) determining, by the computer, whether the cumulative minimum value over preceding spans is greater than or equal to the less than value of the predicate;

(xi) responsive to the computer determining that the cumulative minimum value over preceding spans is greater than or equal to the less than value of the predicate, stopping, by the computer, reading the set of SMDO records corresponding to the column associated with the query; and (xii) responsive to the computer determining that the cumulative minimum value over preceding spans is not greater than or equal to the less than value of the predicate, reading, by the computer, another SMDO record in the set of SMDO records corresponding to a next most recent span of rows for the column associated with the query and repeating steps (vi)-(xii) with the another SMDO record being used as the SMDO record recited in steps (vi)-(xii).

6. The computer-implemented method of claim 1 further comprising:

processing, by the computer, a query having a between values predicate that includes an upper bound value and a lower bound value;

(vi) identifying, by the computer, a maximum value and a minimum value of the most recent span of rows in the SMDO record that corresponds to the column associated with the query;

(vii) determining, by the computer, whether the maximum value of the most recent span of rows is less than the lower bound value of the between values predicate;

(viii) responsive to the computer determining that the maximum value of the most recent span of rows is not less than the lower bound value of the between values predicate, determining, by the computer, whether the minimum value of the most recent span of rows is greater than the upper bound value of the between values predicate;

(ix) responsive to the computer determining that the minimum value of the most recent span of rows is not greater than the upper bound value of the between values predicate, adding, by the computer, the most recent span of rows to the list of spans of rows to scan for results of the query;

(x) identifying, by the computer, a cumulative maximum and a cumulative minimum value over preceding spans in the SMDO record that corresponds to the most recent span of rows;

(xi) determining, by the computer, whether the cumulative maximum value over preceding spans is less than the lower bound value of the between values predicate;

(xii) responsive to the computer determining that the cumulative maximum value over preceding spans is not less than the lower bound value of the between values predicate, determining, by the computer, whether the cumulative minimum value over preceding spans is greater than the upper bound value of the between values predicate;

(xiii) responsive to the computer determining that the cumulative minimum value over preceding spans is greater than the upper bound value of the between values predicate, stopping, by the computer, reading the set of SMDO records corresponding to the column associated with the query; and (xiv) responsive to the computer determining that the cumulative minimum value over preceding spans is not greater than the upper bound value of the between value predicate, reading, by the computer, another SMDO record in the set of SMDO records corresponding to a next most recent span of rows for the column associated with the query and repeating steps (vi)-(xiv) with the another SMDO record being used as the SMDO record recited in steps (vi)-(xiv).

7. The computer-implemented method of claim 1 further comprising:

processing, by the computer, a query having an equal to value predicate;

(vi) identifying, by the computer, a maximum value and a minimum value of the most recent span of rows in the SMDO record that corresponds to the column associated with the query;

(vii) determining, by the computer, whether the maximum value of the most recent span of rows is less than the equal to value of the predicate;

(viii) responsive to the computer determining that the maximum value of the most recent span of rows is not less than the equal to value of predicate, determining, by the computer, whether the minimum value of the most recent span of rows is greater than the equal to value of the predicate;

(ix) responsive to the computer determining that the minimum value of the most recent span of rows is not greater than the equal to value of the predicate, adding, by the computer, the most recent span of rows to the list of spans of rows to scan for results of the query;

(x) identifying, by the computer, a cumulative maximum and a cumulative minimum value over preceding spans in the SMDO record that corresponds to the most recent span of rows;

(xi) determining, by the computer, whether the cumulative maximum value over preceding spans is less than the equal to value of the predicate;

(xii) responsive to the computer determining that the cumulative maximum value over preceding spans is not less than the equal to value of the predicate, determining, by the computer, whether the cumulative minimum value over preceding spans is greater than the equal to value of the predicate;

(xiii) responsive to the computer determining that the cumulative minimum value over preceding spans is greater than the equal to value of the predicate, stopping, by the computer, reading the set of SMDO records corresponding to the column associated with the query; and (xiv) responsive to the computer determining that the cumulative minimum value over preceding spans is not greater than the equal to value of the predicate, reading, by the computer, another SMDO record in the set of SMDO records corresponding to a next most recent span of rows for the column associated with the query and repeating steps (vi)-(xiv) with the another SMDO record being used as the SMDO record recited in steps (vi)-(xiv).

8. The computer-implemented method of claim 1 further comprising:

processing, by the computer, a query having an equal to value predicate;

applying, by the computer, hash functions of a Bloom filter to the equal to value of the predicate to generate a string of bits;

(vi) identifying, by the computer, a Bloom filter string of bits for the most recent span of rows in the SMDO record that corresponds to the column associated with the query;

(vii) comparing, by the computer, the Bloom filter string of bits for the most recent span of rows in the SMDO record to the string of bits for the equal to value of the predicate;

(viii) determining, by the computer, whether at least one bit that is set to "1" in the string of bits for the equal to value based on the comparing is not also set to "1" in a corresponding bit in the Bloom filter string of bits for the most recent span of rows;

(ix) responsive to the computer determining that bits that are set to "1" in the string of bits for the equal to value based on the comparing are also set to "1" in corresponding bits in the Bloom filter string of bits for the most recent span of rows, adding, by the computer, the most recent span of rows to the list of spans of rows to scan for results of the query;

(x) identifying, by the computer, a cumulative Bloom filter string of bits for all preceding spans of rows in an SMDO record corresponding to the most recent span of rows;

(xi) comparing, by the computer, the cumulative Bloom filter string of bits for all preceding spans of rows in the SMDO record corresponding to the most recent span of rows to the string of bits for the equal to value of the predicate;

(xii) determining, by the computer, whether at least one bit that is set to "1" in the string of bits for the equal to value based on the comparison is not also set to "1" in a corresponding bit in the cumulative Bloom filter string of bits for all preceding spans of rows in the SMDO record corresponding to the most recent span of rows;

(xiii) responsive to the computer determining that at least one bit that is set to "1" in the string of bits for the equal to value based on the comparison is not also set to "1" in a corresponding bit in the cumulative Bloom filter string of bits for all preceding spans of rows in the SMDO record corresponding to the most recent span of rows, stopping, by the computer, reading the set of SMDO records corresponding to the column associated with the query; and (xiv) responsive to the computer determining that all bits that are set to "1" in the string of bits for the equal to value based on the comparison are also set to "1" in corresponding bits in the cumulative Bloom filter string of bits for all preceding spans of rows in the SMDO record corresponding to the most recent span of rows, reading, by the computer, another SMDO record in the set of SMDO records corresponding to a next most recent span of rows for the column associated with the query and repeating steps (vi)-(xiv) with the another SMDO record being used as the SMDO record recited in steps (vi)-(xiv).

9. The computer-implemented method of claim 1 further comprising:

processing, by the computer, a query having an in list of values predicate that includes a smallest value and a largest value;

(vi) identifying, by the computer, a maximum value and a minimum value of the most recent span of rows in the SMDO record that corresponds to the column associated with the query;

(vii) determining, by the computer, whether the maximum value of the most recent span of rows is less than the smallest value in the in list of values predicate;

(viii) responsive to the computer determining that the maximum value of the most recent span of rows is not less than the smallest value in the in list of values predicate, determining, by the computer, whether the minimum value of the most recent span of rows is greater than the largest value in the in list of values predicate;

(ix) responsive to the computer determining that the minimum value of the most recent span of rows is not greater than the largest value in the in list of values predicate, determining, by the computer, whether no values in the in list of values predicate are within a range of the minimum value and the maximum value of the most recent span of rows;

(x) responsive to the computer determining that values in the in list of values predicate are within a range of the minimum value and the maximum value of the most recent span of rows, adding, by the computer, the most recent span of rows to the list of spans of rows to scan for results of the query;

(xi) identifying, by the computer, a cumulative maximum and a cumulative minimum value over preceding spans in the SMDO record that corresponds to the most recent span of rows;

(xii) determining, by the computer, whether the cumulative maximum value of the most recent span of rows is less than the smallest value in the in list of values predicate;

(xiii) responsive to the computer determining that the cumulative maximum value of the most recent span of rows is not less than the smallest value in the in list of values predicate, determining, by the computer, whether the cumulative minimum value of the most recent span of rows is greater than the largest value in the in list of values predicate;

(xiv) responsive to the computer determining that the cumulative minimum value of the most recent span of rows is not greater than the largest value in the in list of values predicate, determining, by the computer, whether no values in the in list of values predicate are within a range of the cumulative minimum value and the cumulative maximum value of the most recent span of rows;

(xv) responsive to the computer determining that no values in the in list of values predicate are within a range of the cumulative minimum value and the cumulative maximum value of the most recent span of rows, stopping, by the computer, reading the set of SMDO records corresponding to the column associated with the query; and (xvi) responsive to the computer determining that values in the in list of values predicate are within a range of the cumulative minimum value and the cumulative maximum value over preceding spans of rows, reading, by the computer, another SMDO record in the set of SMDO records corresponding to a next most recent span of rows for the column associated with the query and repeating steps (vi)-(xvi) with the another SMDO record being used as the SMDO record recited in steps (vi)-(xvi).

10. The computer-implemented method of claim 1 further comprising:

processing, by the computer, a query having a not equal to value predicate;

(vi) identifying, by the computer, a maximum value and a minimum value of the most recent span of rows in the SMDO record that corresponds to the column associated with the query;

(vii) determining, by the computer, whether the maximum value and the minimum value of the most recent span of rows are equal and equal to the not equal to value of the predicate;

(viii) responsive to the computer determining that the maximum value and the minimum value of the most recent span of rows are not equal or not equal to the not equal to value of the predicate, adding, by the computer, the most recent span of rows to the list of spans of rows to scan for results of the query;

(ix) identifying, by the computer, a cumulative maximum and a cumulative minimum value over preceding spans in the SMDO record that corresponds to the most recent span of rows;

(x) determining, by the computer, whether the cumulative maximum value and the cumulative minimum value over preceding spans are equal and equal to the not equal to value of the predicate;

(xi) responsive to the computer determining that the cumulative maximum value and the cumulative minimum value over preceding spans are equal and equal to the not equal to value of the predicate, stopping, by the computer, reading the set of SMDO records corresponding to the column associated with the query; and (xii) responsive to the computer determining that the cumulative maximum value and the cumulative minimum value over the preceding spans of rows are not equal or not equal to the not equal to value of the predicate, reading, by the computer, another SMDO record in the set of SMDO records corresponding to a next most recent span of rows for the column associated with the query and repeating steps (vi)-(xii) with the another SMDO record being used as the SMDO record recited in steps (vi)-(xii).

11. The computer-implemented method of claim 1 further comprising:

processing, by the computer, a query having a not in list of values predicate;

(vi) identifying, by the computer, a maximum value and a minimum value of the most recent span of rows in the SMDO record that corresponds to the column associated with the query;

(vii) determining, by the computer, whether the maximum value and the minimum value of the most recent span of rows are equal and equal to a value in the not in list of values predicate;

(viii) responsive to the computer determining that the maximum value and the minimum value of the most recent span of rows are not equal or not equal to a value in the not in list of values predicate, adding, by the computer, the most recent span of rows to the list of spans of rows to scan for results of the query;

(ix) identifying, by the computer, a cumulative maximum and a cumulative minimum value over preceding spans in the SMDO record that corresponds to the most recent span of rows;

(x) determining, by the computer, whether the cumulative maximum value and the cumulative minimum value over preceding spans are equal and equal to a value in the not in list of values predicate;

(xi) responsive to the computer determining that the cumulative maximum value and the cumulative minimum value over preceding spans are equal and equal to a value in the not in list of values predicate, stopping, by the computer, reading the set of SMDO records corresponding to the column associated with the query; and (xii) responsive to the computer determining that the cumulative maximum value and the cumulative minimum value over preceding spans of rows are not equal or not equal to a value in the not in list of values predicate, reading, by the computer, another SMDO record in the set of SMDO records corresponding to a next most recent span of rows for the column associated with the query and repeating steps (vi)-(xii) with the another SMDO record being used as the SMDO record recited in steps (vi)-(xii).

12. A computer system for optimizing database table scans in a presence of a set of Summarizing Meta-Data Object (SMDO) records that store a maximum value, a minimum value, and a Bloom filter associated with each respective span of rows in a table for a column and that store computed values for cumulative maximum, cumulative minimum, and cumulative Bloom filter for the column over all previously generated spans of rows in the table, the computer system comprising:

a bus system;

a storage device connected to the bus system, wherein the storage device stores program instructions; and a processor connected to the bus system, wherein the processor executes the program instructions to:

read an SMDO record in the set of SMDO records corresponding to a most recent span of rows for a column in the table associated with a query predicate, wherein the SMDO record includes SMDO fields required by a type of the query predicate;

(i) determine whether a condition for excluding a span of rows is true for the SMDO record corresponding to the most recent span of rows for the column based on the type of the query predicate;

(ii) add the most recent span of rows to a list of spans of rows to scan for results of the query predicate in response to determining that a condition for excluding a span of rows is not true for the SMDO record corresponding to the most recent span of rows for the column based on the type of the query predicate;

(iii) determine whether a condition for excluding all preceding spans of rows is true for the SMDO record corresponding to the most recent span of rows for the column based on the type of the query predicate;

(iv) stop reading the set of SMDO records in response to determining that a condition for excluding all preceding spans of rows is true for the SMDO record corresponding to the most recent span of rows for the column based on the type of the query predicate; and (v) read another SMDO record in the set of SMDO records corresponding to a next most recent span of rows for the column in the table associated with the query predicate and repeat steps (i)-(v) with the another SMDO record being used as the SMDO record recited in steps (i)-(v) in response to determining that a condition for excluding all preceding spans of rows is not true for the SMDO record corresponding to the most recent span of rows for the column based on the type of the query predicate.

13. The computer system of claim 12, wherein the processor further executes the program instructions to:

determine whether a new row to be inserted into the table fits in a current span of rows;

insert the new row into the current span of rows in response to determining that the new row to be inserted into the table does fit in the current span of rows;

for each table column that has an SMDO record set, update a minimum value, a maximum value, and a Bloom filter value for a current SMDO record based on a column value from the new row inserted into the table;

start a new span of rows and insert the new row in the new span of rows in response to determining that the new row to be inserted into the table does not fit in the current span of rows;

fetch a next column from the new row;

determine whether the next column has an SMDO record set that includes a maximum preceding value;

set the maximum preceding value for the SMDO record equal to the greater of the maximum value and the maximum preceding value from a preceding SMDO record for the next column in response to determining that the next column does have an SMDO record set that includes a maximum preceding value;

determine whether the next column has an SMDO record set that includes a minimum preceding value;

set the minimum preceding value for the SMDO record equal to the lesser of the minimum value and the minimum preceding value from the preceding SMDO record for the next column in response to determining that the next column does have an SMDO record set that includes a minimum preceding value;

determine whether the next column has an SMDO record set that includes a Bloom filter preceding value; and set the Bloom filter preceding value for the SMDO record equal to bitwise OR of the Bloom filter value and the Bloom filter preceding value from the preceding SMDO record for the next column in response to determining that the next column does have an SMDO record set that includes a Bloom filter preceding value.

14. The computer system of claim 12, wherein the processor further executes the program instructions to:

receive a query from a client device via a network;

decompose the query into a set of simple predicates;

select a simple predicate in the set of simple predicates;

determine a type of the selected simple predicate;

process SMDO records to eliminate spans of rows that do not need to be scanned based on the type of the selected simple predicate;

combine a set of spans of rows returned by the type of the selected simple predicate based on a type of combining operator corresponding to the query; and process the query against spans of rows identified by SMDO record processing as needing scanning.

15. A computer program product for optimizing database table scans in a presence of a set of Summarizing Meta-Data Object (SMDO) records that store a maximum value, a minimum value, and a Bloom filter associated with each respective span of rows in a table for a column and that store computed values for cumulative maximum, cumulative minimum, and cumulative Bloom filter for the column over all previously generated spans of rows in the table, the computer program product comprising a computer readable storage medium having program instructions embodied therewith, the program instructions executable by a computer to cause the computer to perform a method comprising:

reading, by the computer, an SMDO record in the set of SMDO records corresponding to a most recent span of rows for a column in the table associated with a query predicate, wherein the SMDO record includes SMDO fields required by a type of the query predicate;

(i) determining, by the computer, whether a condition for excluding a span of rows is true for the SMDO record corresponding to the most recent span of rows for the column based on the type of the query predicate;

(ii) responsive to the computer determining that a condition for excluding a span of rows is not true for the SMDO record corresponding to the most recent span of rows for the column based on the type of the query predicate, adding, by the computer, the most recent span of rows to a list of spans of rows to scan for results of the query predicate;

(iii) determining, by the computer, whether a condition for excluding all preceding spans of rows is true for the SMDO record corresponding to the most recent span of rows for the column based on the type of the query predicate;

(iv) responsive to the computer determining that a condition for excluding all preceding spans of rows is true for the SMDO record corresponding to the most recent span of rows for the column based on the type of the query predicate, stopping, by the computer, reading the set of SMDO records; and (v) responsive to the computer determining that a condition for excluding all preceding spans of rows is not true for the SMDO record corresponding to the most recent span of rows for the column based on the type of the query predicate, reading, by the computer, another SMDO record in the set of SMDO records corresponding to a next most recent span of rows for the column in the table associated with the query predicate and repeating steps (i)-(v) with the another SMDO record being used as the SMDO record recited in steps (i)-(v).

16. The computer program product of claim 15 further comprising:

determining, by the computer, whether a new row to be inserted into the table fits in a current span of rows;

responsive to the computer determining that the new row to be inserted into the table does fit in the current span of rows, inserting, by the computer, the new row into the current span of rows;

for each table column that has an SMDO record set, updating, by the computer, a minimum value, a maximum value, and a Bloom filter value for a current SMDO record based on a column value from the new row inserted into the table;

responsive to the computer determining that the new row to be inserted into the table does not fit in the current span of rows, starting, by the computer, a new span of rows and inserting, by the computer, the new row in the new span of rows;

fetching, by the computer, a next column from the new row;

determining, by the computer, whether the next column has an SMDO record set that includes a maximum preceding value;

responsive to the computer determining that the next column does have an SMDO record set that includes a maximum preceding value, setting, by the computer, the maximum preceding value for the SMDO record equal to the greater of the maximum value and the maximum preceding value from a preceding SMDO record for the next column;

determining, by the computer whether the next column has an SMDO record set that includes a minimum preceding value;

responsive to the computer determining that the next column does have an SMDO record set that includes a minimum preceding value, setting, by the computer, the minimum preceding value for the SMDO record equal to the lesser of the minimum value and the minimum preceding value from the preceding SMDO record for the next column;

determining, by the computer whether the next column has an SMDO record set that includes a Bloom filter preceding value; and responsive to the computer determining that the next column does have an SMDO record set that includes a Bloom filter preceding value, setting, by the computer, the Bloom filter preceding value for the SMDO record equal to bitwise OR of the Bloom filter value and the Bloom filter preceding value from the preceding SMDO record for the next column.

17. The computer program product of claim 15 further comprising:

receiving, by the computer, a query from a client device via a network;

decomposing, by the computer, the query into a set of simple predicates;

selecting, by the computer, a simple predicate in the set of simple predicates;

determining, by the computer, a type of the selected simple predicate;

processing, by the computer, SMDO records to eliminate spans of rows that do not need to be scanned based on the type of the selected simple predicate;

combining, by the computer, a set of spans of rows returned by the type of the selected simple predicate based on a type of combining operator corresponding to the query; and processing, by the computer, the query against spans of rows identified by SMDO record processing as needing scanning.

18. The computer program product of claim 15 further comprising:

processing, by the computer, a query having a greater than value predicate;

(vi) identifying, by the computer, a maximum value of the most recent span of rows in the SMDO record that corresponds to the column associated with the query;

(vii) determining, by the computer, whether the maximum value of the most recent span of rows is less than or equal to the greater than value of the predicate;

(viii) responsive to the computer determining that the maximum value of the most recent span of rows is not less than or equal to the greater than value of the predicate, adding, by the computer, the most recent span of rows to the list of spans of rows to scan for results of the query;

(ix) identifying, by the computer, a cumulative maximum value over preceding spans in the SMDO record that corresponds to the most recent span of rows;

(x) determining, by the computer, whether the cumulative maximum value over preceding spans is less than or equal to the greater than value of the predicate;

(xi) responsive to the computer determining that the cumulative maximum value over preceding spans is less than or equal to the greater than value of the predicate, stopping, by the computer, reading the set of SMDO records corresponding to the column associated with the query; and (xii) responsive to the computer determining that the cumulative maximum value over preceding spans is not less than or equal to the greater than value of the predicate, reading, by the computer, another SMDO record in the set of SMDO records corresponding to a next most recent span of rows for the column associated with the query and repeating steps (vi)-(xii) with the another SMDO record being used as the SMDO record recited in steps (vi)-(xii).

19. The computer program product of claim 15 further comprising:

processing, by the computer, a query having a less than value predicate;

(vi) identifying, by the computer, the minimum value of the most recent span of rows in the SMDO record that corresponds to the column associated with the query;

(vii) determining, by the computer, whether the minimum value of the most recent span of rows is greater than or equal to the less than value of the predicate;

(viii) responsive to the computer determining that the minimum value of the most recent span of rows is not greater than or equal to the less than value of the predicate, adding, by the computer, the most recent span of rows to the list of spans of rows to scan for results of the query;

(ix) identifying, by the computer, a cumulative minimum value over preceding spans in the SMDO record that corresponds to the most recent span of rows;

(x) determining, by the computer, whether the cumulative minimum value over preceding spans is greater than or equal to the less than value of the predicate;

(xi) responsive to the computer determining that the cumulative minimum value over preceding spans is greater than or equal to the less than value of the predicate, stopping, by the computer, reading the set of SMDO records corresponding to the column associated with the query; and (xii) responsive to the computer determining that the cumulative minimum value over preceding spans is not greater than or equal to the less than value of the predicate, reading, by the computer, another SMDO record in the set of SMDO records corresponding to a next most recent span of rows for the column associated with the query and repeating steps (vi)-(xii) with the another SMDO record being used as the SMDO record recited in steps (vi)-(xii).

20. The computer program product of claim 15 further comprising:

processing, by the computer, a query having a between values predicate that includes an upper bound value and a lower bound value;

(vi) identifying, by the computer, a maximum value and a minimum value of the most recent span of rows in the SMDO record that corresponds to the column associated with the query;

(vii) determining, by the computer, whether the maximum value of the most recent span of rows is less than the lower bound value of the between values predicate;

(viii) responsive to the computer determining that the maximum value of the most recent span of rows is not less than the lower bound value of the between values predicate, determining, by the computer, whether the minimum value of the most recent span of rows is greater than the upper bound value of the between values predicate;

(ix) responsive to the computer determining that the minimum value of the most recent span of rows is not greater than the upper bound value of the between values predicate, adding, by the computer, the most recent span of rows to the list of spans of rows to scan for results of the query;

(x) identifying, by the computer, a cumulative maximum and a cumulative minimum value over preceding spans in the SMDO record that corresponds to the most recent span of rows;

(xi) determining, by the computer, whether the cumulative maximum value over preceding spans is less than the lower bound value of the between values predicate;

(xii) responsive to the computer determining that the cumulative maximum value over preceding spans is not less than the lower bound value of the between values predicate, determining, by the computer, whether the cumulative minimum value over preceding spans is greater than the upper bound value of the between values predicate;

(xiii) responsive to the computer determining that the cumulative minimum value over preceding spans is greater than the upper bound value of the between values predicate, stopping, by the computer, reading the set of SMDO records corresponding to the column associated with the query; and (xiv) responsive to the computer determining that the cumulative minimum value over preceding spans is not greater than the upper bound value of the between value predicate, reading, by the computer, another SMDO record in the set of SMDO records corresponding to a next most recent span of rows for the column associated with the query and repeating steps (vi)-(xiv) with the another SMDO record being used as the SMDO record recited in steps (vi)-(xiv).

\* \* \* \* \*